United States Patent
Tuteja et al.

(10) Patent No.: US 9,834,459 B2
(45) Date of Patent: Dec. 5, 2017

(54) DEVICES AND METHODS FOR ELECTRIC FIELD DRIVEN ON-DEMAND SEPARATION OF LIQUID-LIQUID MIXTURES

(71) Applicant: THE REGENTS OF THE UNIVERSITY OF MICHIGAN, Ann Arbor, MI (US)

(72) Inventors: Anish Tuteja, Ann Arbor, MI (US); Arun Kumar Kota, Fort Collins, CO (US); Gibum Kwon, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 325 days.

(21) Appl. No.: 14/401,778

(22) PCT Filed: May 17, 2013

(86) PCT No.: PCT/US2013/041604
§ 371 (c)(1),
(2) Date: Nov. 17, 2014

(87) PCT Pub. No.: WO2013/173722
PCT Pub. Date: Nov. 21, 2013

(65) Prior Publication Data
US 2015/0136606 A1    May 21, 2015

Related U.S. Application Data

(60) Provisional application No. 61/648,383, filed on May 17, 2012.

(51) Int. Cl.
*B01D 17/04*    (2006.01)
*C02F 1/469*    (2006.01)
(Continued)

(52) U.S. Cl.
CPC ............ *C02F 1/4696* (2013.01); *B01D 17/06* (2013.01); *B01D 17/085* (2013.01); *B01D 61/425* (2013.01)

(58) Field of Classification Search
CPC .... B01D 17/06; B01D 17/085; B01D 61/425; B01D 69/00; B01D 69/02; C02F 1/404696; C02F 2101/32; C02F 2101/3251
See application file for complete search history.

(56) References Cited

U.S. PATENT DOCUMENTS 3,891,496 A    6/1975   Erwin
3,922,403 A    11/1975  Sample, Jr. et al.
(Continued)

FOREIGN PATENT DOCUMENTS

WO    2005/068399 A1    7/2005
WO    2009/009185 A2    1/2009
(Continued)

OTHER PUBLICATIONS

Adams, Richard. Technology Commercialization Opportunity Polyhedral Oligomeric Silsesquioxanes (POSS): A New Generation of Lighter Weight, Higher Performance Polymeric Materials.pp. 1-3 (Available online Jun. 9, 2010).
(Continued)

*Primary Examiner* — Keith Hendricks
*Assistant Examiner* — Salil Jain
(74) *Attorney, Agent, or Firm* — Harness, Dickey & Pierce, P.L.C.

(57) ABSTRACT

Devices and methods for electric field driven on-demand separation of liquid-liquid mixtures are provided. For example, methods for separating liquid-liquid mixtures, such as free oil and water, oil-in-water emulsions and water-in-oil emulsions, are provided that have separation
(Continued)

efficiencies up to about 99.9%. The liquid-liquid mixture is contacted with a separator membrane assembly comprising a separator membrane formed of a porous oleophobic (or superoleophobic) material and an electrically conductive member. An electrical potential is applied across the porous oleophobic (or superoleophobic) material of the separator membrane to facilitate passage and separation of at least a portion of the first component through the separator membrane. Separation devices and such separator membrane assemblies are also provided.

23 Claims, 12 Drawing Sheets

(51) Int. Cl.
  *B01D 17/06* (2006.01)
  *B01D 61/42* (2006.01)
  *B01D 17/00* (2006.01)

(56) References Cited

U.S. PATENT DOCUMENTS

| | | | |
|---|---|---|---|
| 4,026,874 A | 5/1977 | Sample, Jr. et al. | |
| 4,119,485 A | 10/1978 | Erwin | |
| 4,127,164 A | 11/1978 | Erwin | |
| 4,556,623 A * | 12/1985 | Tamura | C08G 73/00 430/133 |
| 5,199,486 A | 4/1993 | Balmer et al. | |
| 5,269,935 A | 12/1993 | Clough et al. | |
| 5,385,175 A | 1/1995 | Rivero et al. | |
| 5,518,610 A | 5/1996 | Pierpoline | |
| 6,716,919 B2 | 4/2004 | Lichtenhan et al. | |
| 7,157,117 B2 | 1/2007 | Mikhael et al. | |
| 7,193,015 B1 | 3/2007 | Mabry et al. | |
| 7,217,683 B1 | 5/2007 | Blanski et al. | |
| 7,695,629 B2 | 4/2010 | Salamitou et al. | |
| 7,897,667 B2 | 3/2011 | Mabry et al. | |
| 8,177,985 B2 | 5/2012 | Akay et al. | |
| 8,227,381 B2 | 7/2012 | Rodrigues et al. | |
| 8,562,839 B2 | 10/2013 | Cho | |
| 9,186,631 B2 | 11/2015 | Tuteja et al. | |
| 2004/0067339 A1 | 4/2004 | Gandon et al. | |
| 2004/0209139 A1 | 10/2004 | Extrand | |
| 2006/0286555 A1 | 12/2006 | Van Beuningen et al. | |
| 2007/0237947 A1 | 10/2007 | Gleason et al. | |
| 2008/0146734 A1 | 6/2008 | Youngblood et al. | |
| 2010/0050871 A1 | 3/2010 | Moy et al. | |
| 2010/0316842 A1* | 12/2010 | Tuteja | D01D 5/003 428/143 |
| 2011/0084421 A1* | 4/2011 | Soane | C09D 7/005 264/219 |
| 2011/0229706 A1 | 9/2011 | Epstein et al. | |
| 2011/0283778 A1 | 11/2011 | Angelescu et al. | |
| 2012/0000853 A1 | 1/2012 | Tuteja et al. | |
| 2012/0160362 A1 | 6/2012 | Smith et al. | |
| 2013/0072609 A1 | 3/2013 | Haddad et al. | |
| 2013/0122225 A1 | 5/2013 | Azimi et al. | |
| 2013/0178568 A1 | 7/2013 | Meuler et al. | |
| 2013/0264287 A1* | 10/2013 | Zhang | C02F 1/40 210/639 |
| 2014/0290699 A1 | 10/2014 | Bengaluru Subramanyam et al. | |
| 2015/0065674 A1 | 3/2015 | Ramirez et al. | |
| 2015/0109313 A1 | 4/2015 | Heggelund et al. | |
| 2015/0136606 A1 | 5/2015 | Tuteja et al. | |
| 2015/0353813 A1 | 12/2015 | Guenthner et al. | |
| 2016/0129400 A1 | 5/2016 | Tuteja et al. | |
| 2016/0281007 A1 | 9/2016 | Reams et al. | |

FOREIGN PATENT DOCUMENTS

| | | |
|---|---|---|
| WO | 2010/028752 A1 | 3/2010 |
| WO | 2011/159699 A2 | 12/2011 |
| WO | 2013/173722 A2 | 11/2013 |
| WO | 2015/054406 | 4/2015 |

OTHER PUBLICATIONS

Chimuka, Luke, et al., "Why liquid membrane extraction is an attractive alternative in sample preparation," Pure Appl. Chem., vol. 76, No. 4, pp. 707-722 (2004).

Ehrenberg, Rachel, "Filter unmixes oil and water: Combination of chemistry and gravity could help clean spills," Science News, vol. 182, No. 7, p. 17.

Kota, Arun K., et al., "Hygro-responsive membranes for effective oil-water separation," Nature Communications, vol. 3, No. 1025, pp. 1-8 (Aug. 28, 2012).

Mabry, Joseph M., et al., "Fluorinated Polyhedral Oligomeric Silsesquioxanes (F-POSS)," Angewandte Chemie Int. Ed., vol. 47, pp. 4137-4140 (2008) (available online Apr. 24, 2008).

Sigma-Alrdrich Fine Chemicals. Silsesquioxanes Bridging the Gap between Polymers & Ceramics. ChemFiles. vol. 1. No. 6. pp. 1-14 (2001).

Tuteja, Anish, et al., "Designing Superoleophobic Surfaces," Science, vol. 318, pp. 1618-1622 (Dec. 7, 2007).

Kwon, Gibum et al. On-Demand Separation of Oil-Water Mixtures Advanced Materials. vol. 24. Issue 27. pp. 3666-3671 (2012).

The International Search Report and Written Opinion of the International Searching Authority dated Mar. 5, 2015 for PCT International Application No. PCT/US2014/059727 (Pub. No. WO2015/054406).

The International Search Report and Written Opinion of the International Searching Authority dated Dec. 2, 2013 for PCT International Application No. PCT/US2013/041604 (Pub. No. WO 2013/73722).

Kota, Arun K., et al., "Superomniphobic surfaces: Design and durability," MRS Bulletin, vol. 38, pp. 383-390 (May 2013).

Feng, Xinjian, et al., "Design and Creation of Superwetting/Antiwetting Surfaces," Advanced Materials, vol. 18, pp. 3063-3078 (2006).

Kota, Arun K., et al., "The design and applications of superomniphobic surfaces," NPG Asia Materials, vol. 6, No. e109, pp. 1-16 (2014).

Tuteja, Anish, et al., "Design Parameters for Superhydrophobicity and Superoleophobicity." Mrs Bulletin, vol. 33, pp. 752-758 (Aug. 2008).

Tuteja, Anish, et al., "Robust Omniphobic Surfaces." PNAS, vol. 105. No. 14, pp. 18200-18205 (Nov. 25, 2008).

Choi, Wonjae, et al., "Fabrics with Tunable Oleophobicity." Advanced Materials, vol. 21., pp. 1-6. (2009).

Chhatre, Shreerang S., et al., "Scale Dependence of Omniphobic Mesh Surfaces," Langmuir Article, vol. 26, No. 6, pp. 4027-4035 (2010).

Young, Thomas, "An Essay to the Cohesion of Fluids," Philosophical Transactions of the Royal Society of London, vol. 95, pp. 65-87. (1805).

Shirtcliffe, Neil J. et al., "Porous Materials show Superhydrophobic to Superhydrophilic Switching," Chemical Communication, pp. 3135-3137. (2005).

Choi, Wonjae et al., "A Modified Cassie-Baxter Relationship to Explain Contact Angle Hysteresis and Anisotrophy on Non-wetting Textured Surfaces," Journal of Colloid and Interface Science, vol. 339. pp. 208-216. (2009).

Howarter, John A. et al., "Amphiphile grafted Membranes for the Separation of Oil-in-Water Dispersions," Journal of Colloid and Interface Science, vol. 329. pp. 127-132. (2009).

The International Search Report and Written Opinion of the International Searching Authority dated Feb. 28, 2012 for PCT International Application No. PCT/US2011/40353 (Pub. No. WO 2011/15699).

(56) References Cited

OTHER PUBLICATIONS

International Search Report and Written Opinion of the ISA for PCT/US2013/041604. ISA/KR, dated Dec. 2, 2013.
Kwon, Gibum et al., 'On-demand separation of oil-water mixtures', Advanced Materials, Jun. 12, 2012, vol. 24, Issue 27, pp. 3666-3671.
Anish Tuteja et al, "Designing Superoleophobic Surfaces," Science, vol. 318, Dec. 7, 2007, pp. 1618-1622.
Mabry, Joseph M. et al: "Fluorinated Polyhedral Oligomeric Silsesquioxanes," Angewandte Chemie International Edition, vol. 47, Issue 22, pp. 4137-4140, May 19, 2008.
U.S. Appl. No. 14/939,953, filed Nov. 12, 2015, Tuteja, Anish, et al.
U.S. Appl. No. 15/027,983, filed Apr. 7, 2016, Reams, Josiah T., et al.,

* cited by examiner

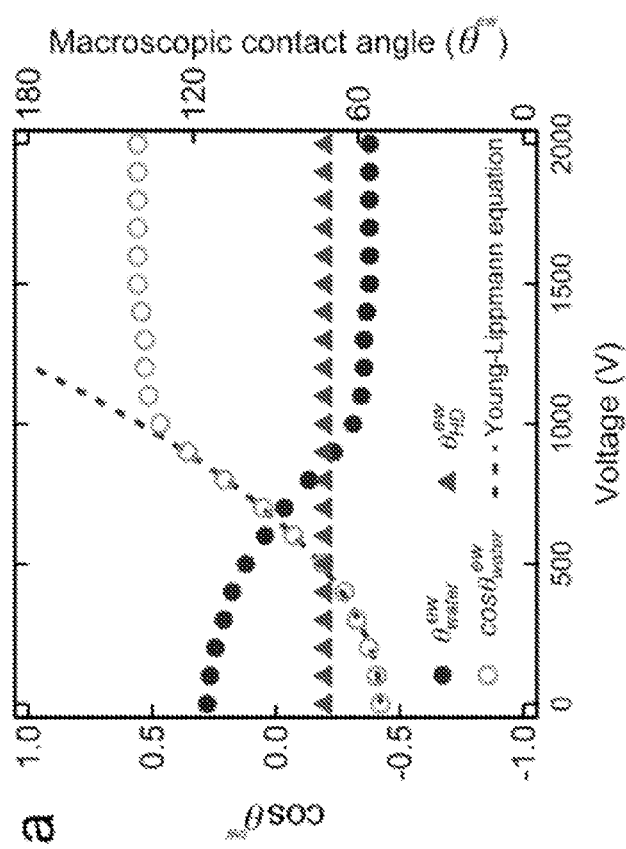
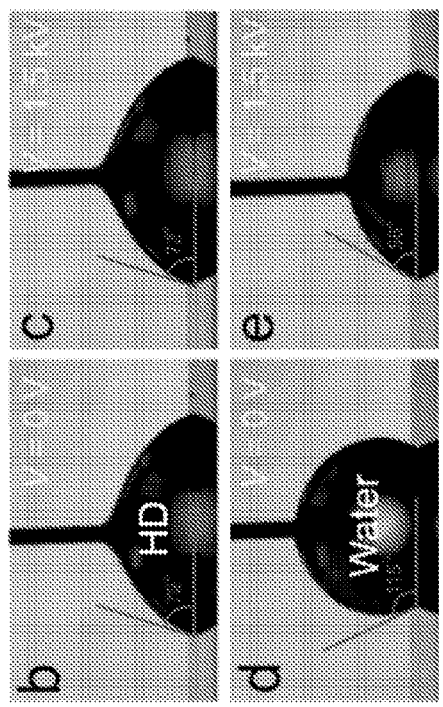
Figures 1(a)-(e)

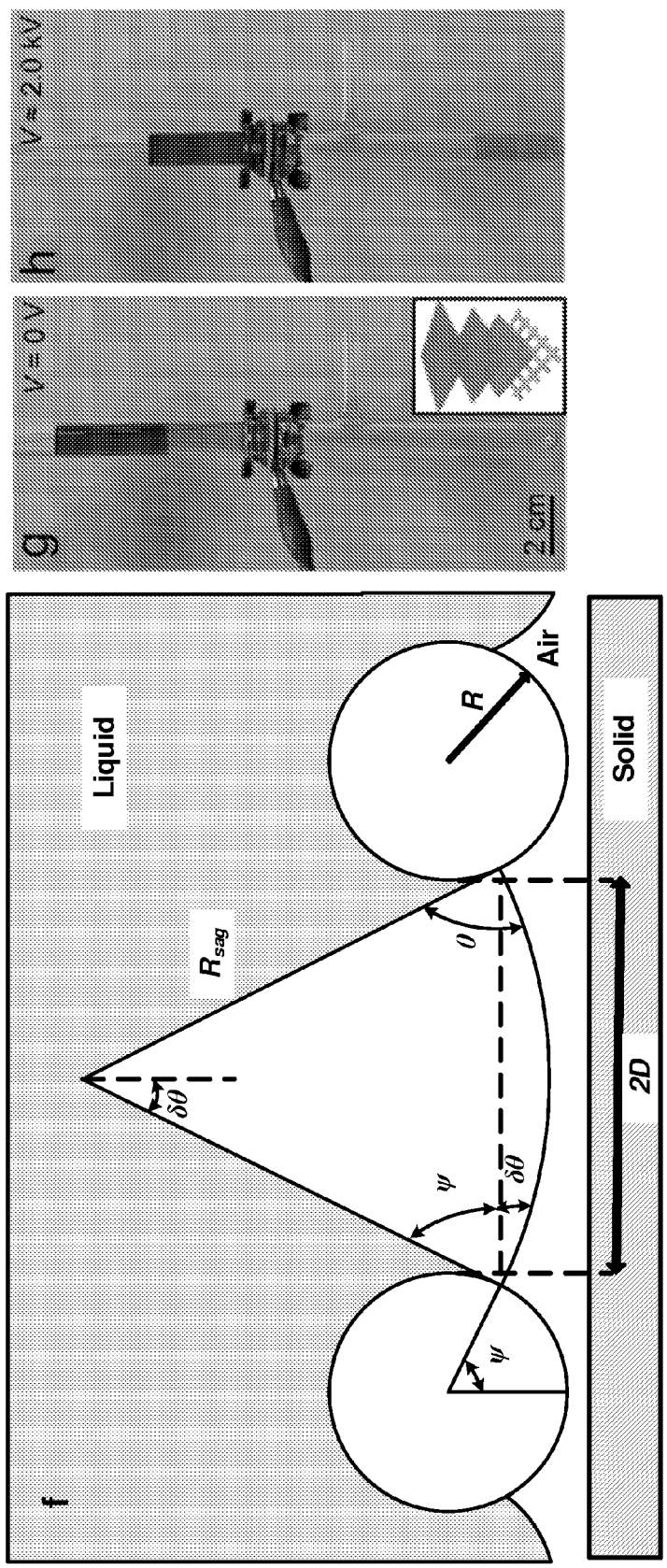
Figures 1(f)-(h)

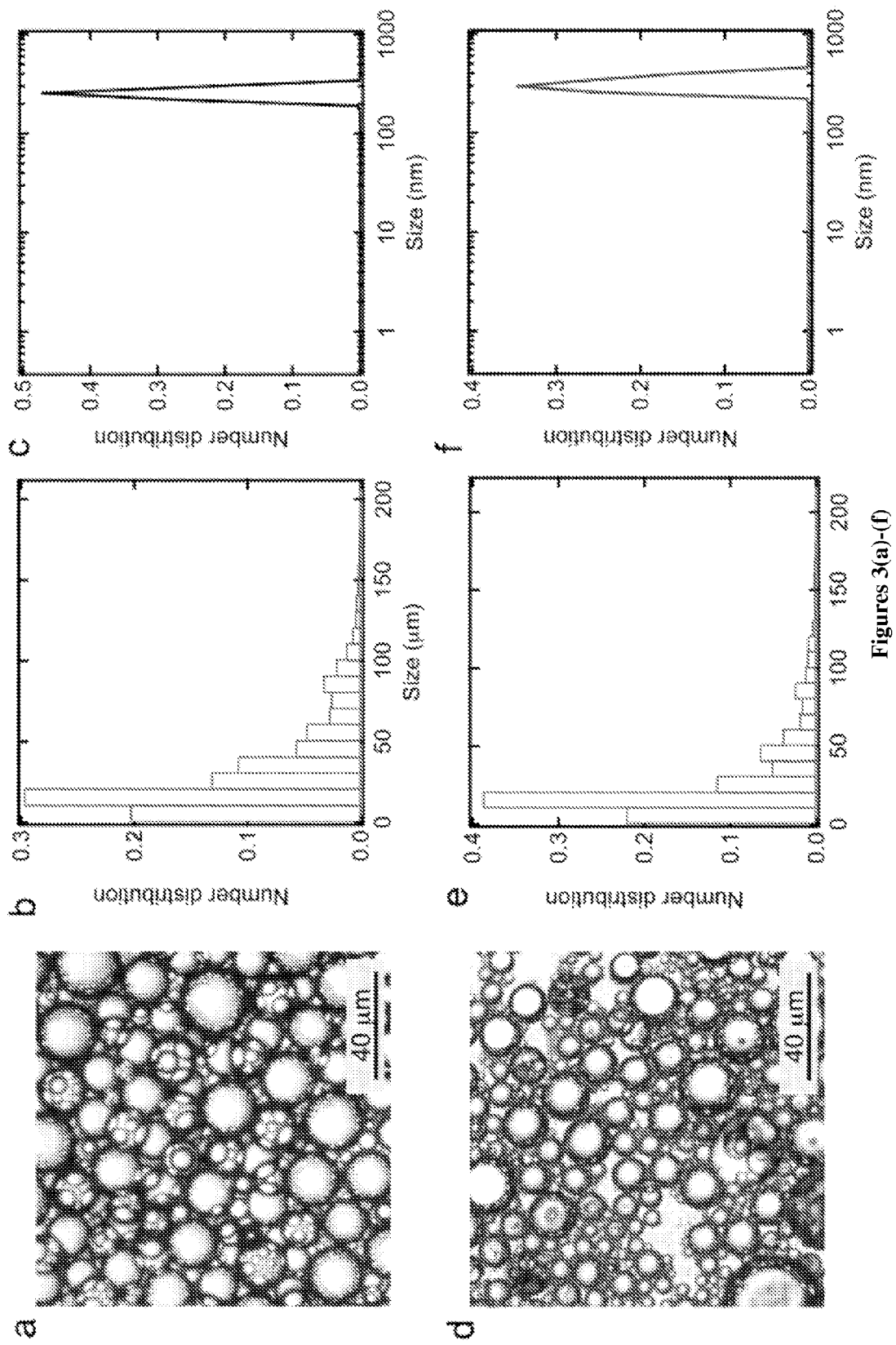
Figures 3(a)-(f)

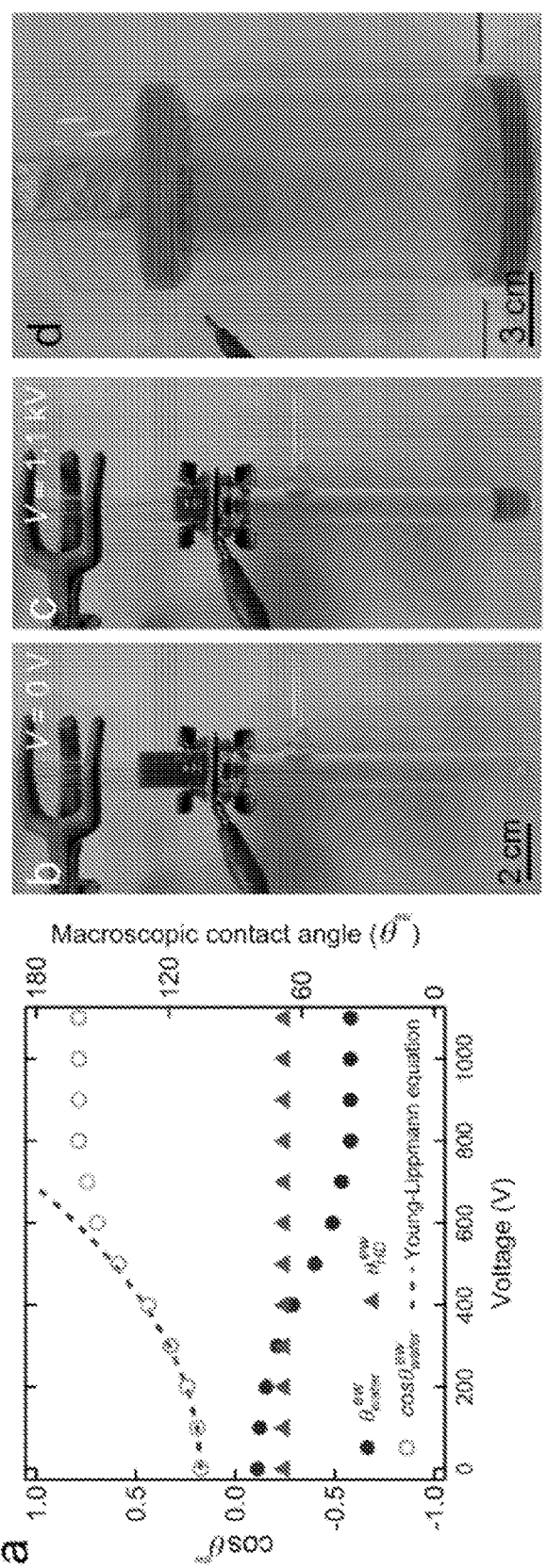
Figures 4(a)-(d)

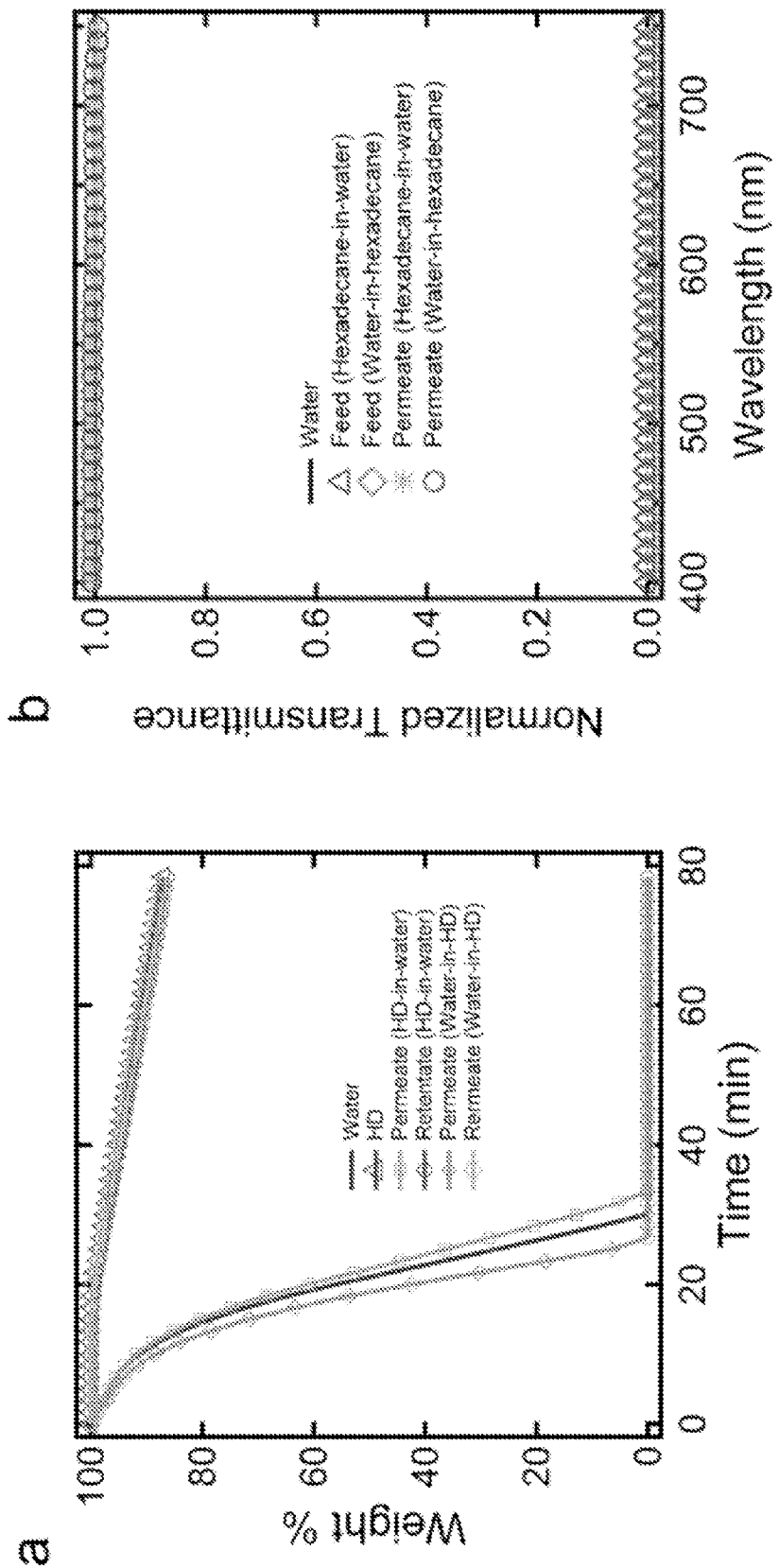
Figures 5(a)-(b)

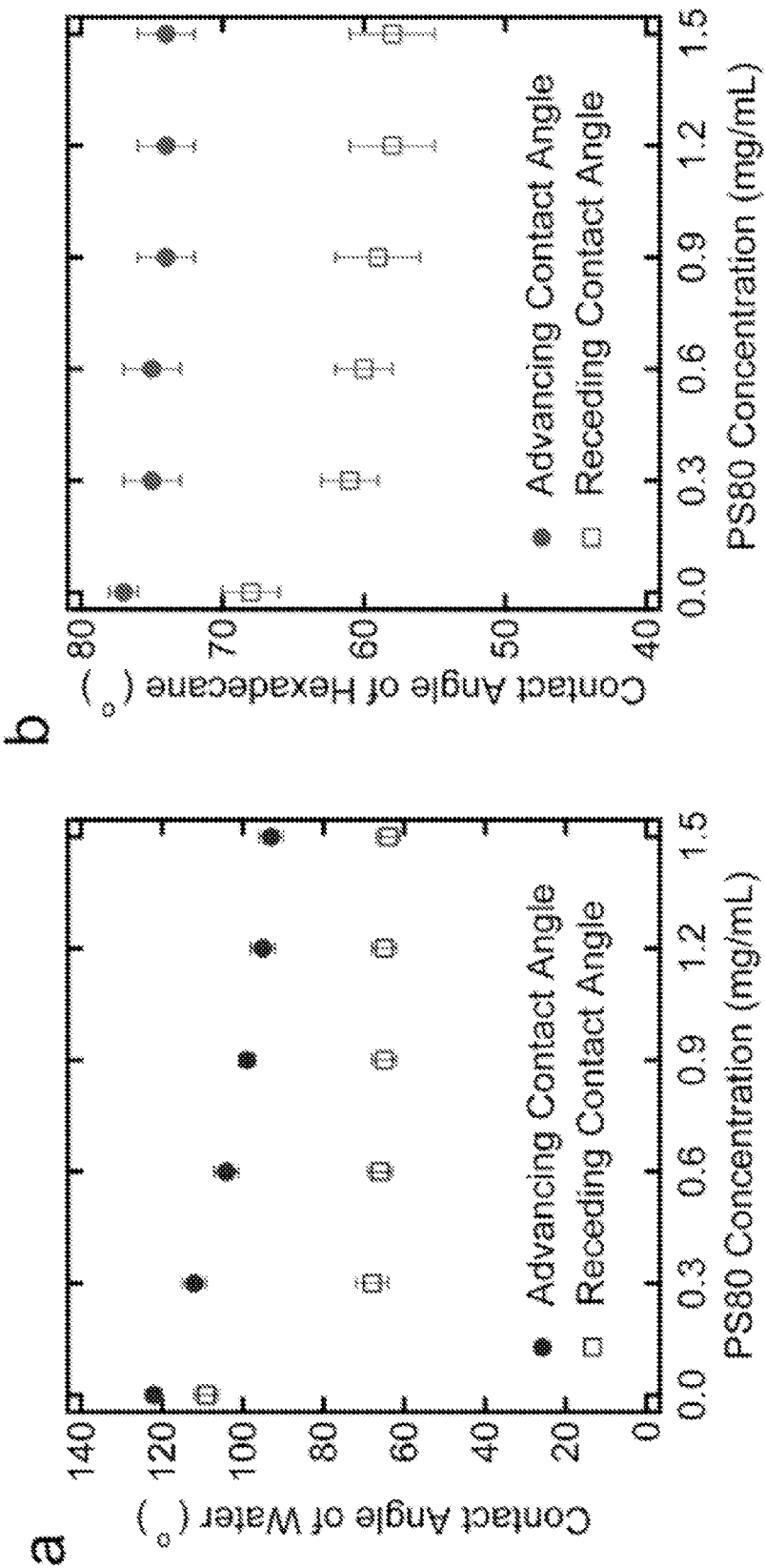
Figures 6(a)-(b)

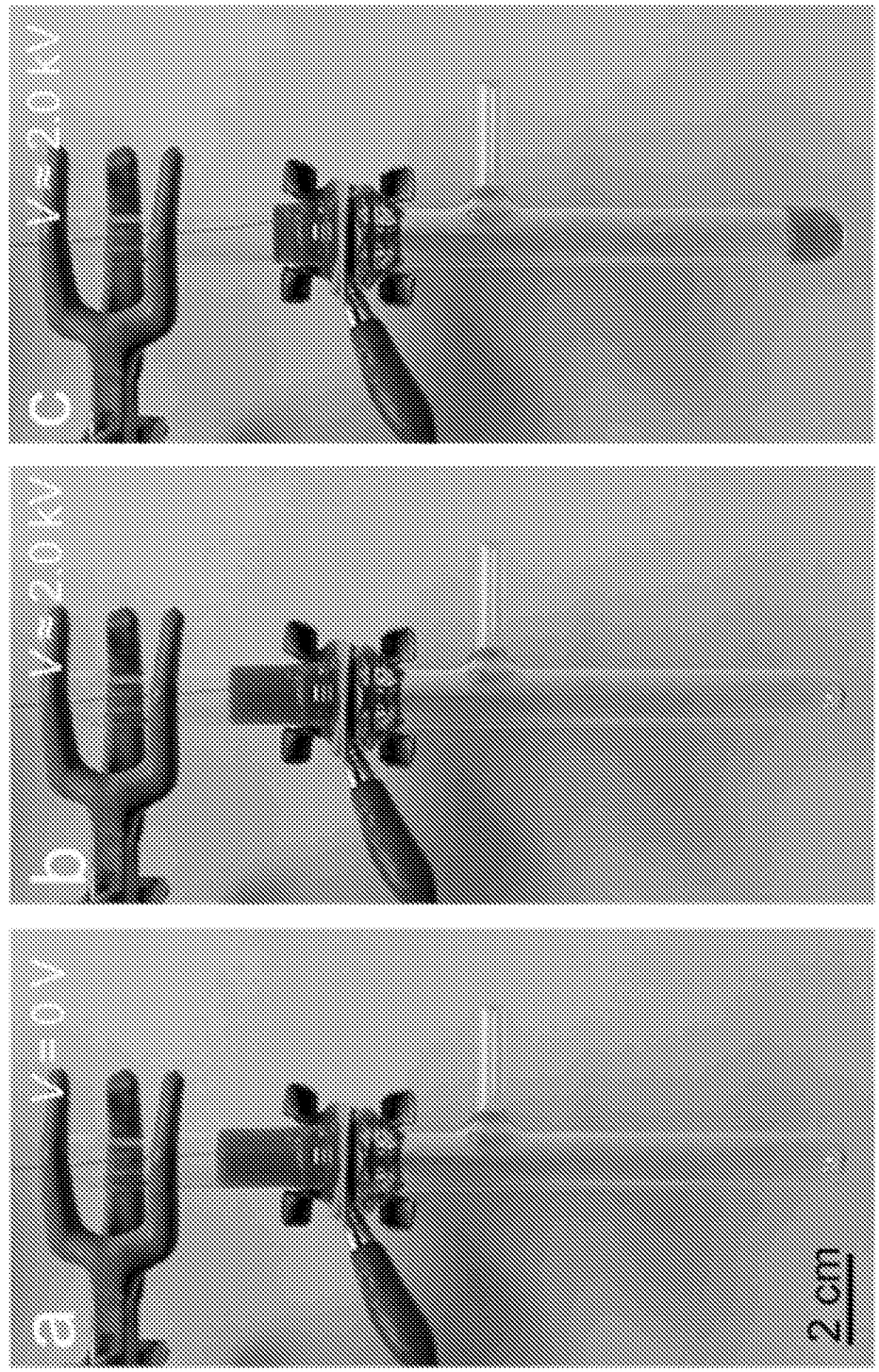
Figures 7(a)-(c)

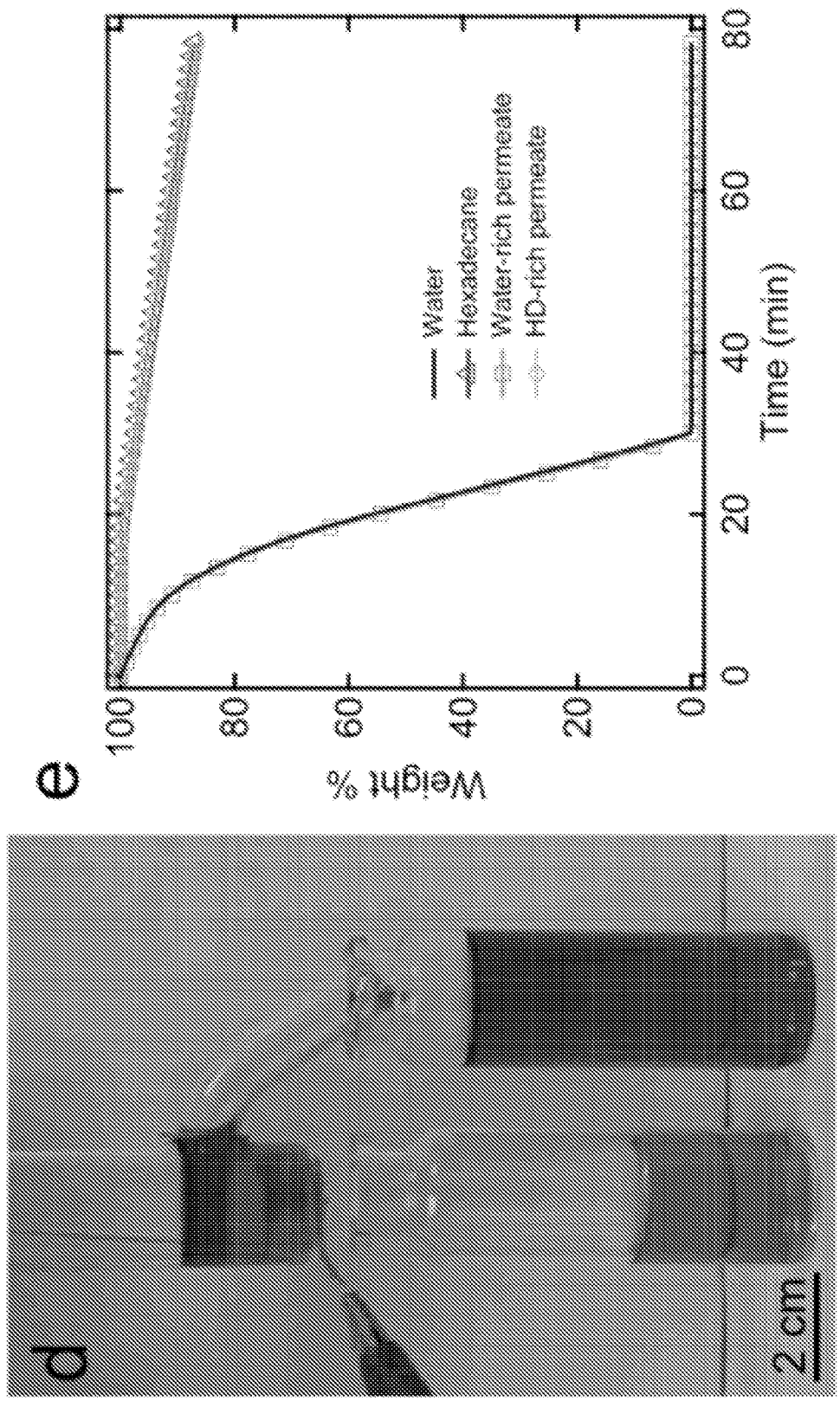
Figures 7(d)-(e)

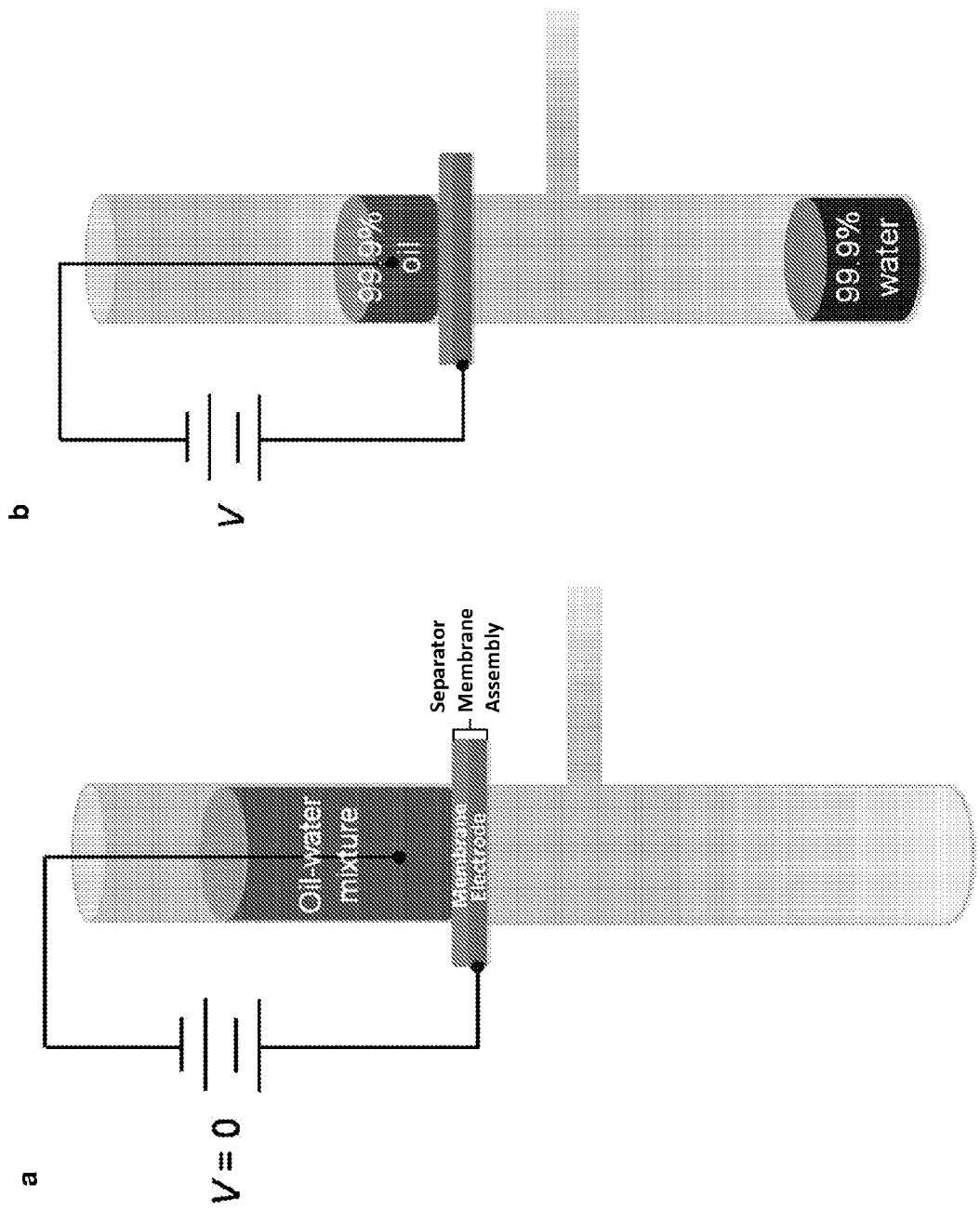
Figures 10(a)-(b)

DEVICES AND METHODS FOR ELECTRIC FIELD DRIVEN ON-DEMAND SEPARATION OF LIQUID-LIQUID MIXTURES

This application is a 371 U.S. National Phase application of International Application No. PCT/US2013/041604, filed May 17, 2013 and published in English as WO 2013/173722 A2 on Nov. 21, 2013, which claims priority to and the benefit of U.S. Provisional Application No. 61/648,383, filed on May 17, 2012. The entire disclosures of each of the above applications are incorporated herein by reference.

GOVERNMENT SUPPORT

This invention was made with U.S. Government support under FA9550-10-1-0523 awarded by the Air Force Office of Scientific Research (AFOSR). The Government has certain rights in the invention.

FIELD

The present disclosure relates to separations of liquid-liquid mixtures, such as oil-water mixture, by employing devices comprising electric field driven separator membrane technologies.

BACKGROUND

This section provides background information related to the present disclosure which is not necessarily prior art.

With increasing environmental awareness and tighter regulations, novel strategies to separate oils from industrial wastewaters, polluted oceanic waters, and oil-spill mixtures, especially in the presence of surfactants, are highly desired. Membrane-based technologies are attractive for demulsification, i.e., the conversion of an emulsion to a free oil-water mixture, because they are relatively energy-efficient and applicable across a wide range of industrial processes. However, separations involving demulsification typically require multiple distinct stages or processes, so that demulsification is followed by either gravity driven separation or skimming for the complete separation of free oil-water mixtures. The present teachings provide improved separation processes for membrane-based technology, which can achieve demulsification among other separations, in a single unit operation. Such separation processes can be gravity driven and are capable of separating all types of oil-water mixtures, with greater than or equal to about 99.9% separation efficiency. Furthermore, the present disclosure provides separations processes that can be actuated and rapidly controlled on-demand.

SUMMARY

This section provides a general summary of the disclosure, and is not a comprehensive disclosure of its full scope or all of its features.

In various aspects, the present teachings provide devices and methods for electric field driven on-demand separation of liquid-liquid mixtures. For example, in one variation, a method of separating a liquid-liquid mixture is provided. The liquid-liquid mixture comprises a first component and a second distinct component. In certain aspects, the first component is polar or hydrophilic while the second component is non-polar or hydrophobic. The method comprises contacting the liquid-liquid mixture with a separator membrane that can be activated on-demand. The separator membrane comprises a porous oleophobic or superoleophobic material. An electrical potential is applied across the porous oleophobic or superoleophobic material of the membrane to actuate or facilitate passage and separation of at least a portion of the first component through the separator membrane. In this manner, greater than or equal to about 85% of an initial amount of the first component present in the liquid-liquid mixture is separated by using the actuatable separation process. In certain variations, greater than or equal to about 97% of an initial amount of the first component is separated from the liquid-liquid mixture. In other variations, greater than or equal to about 99% of an initial amount of the first component is separated from the liquid-liquid mixture.

In certain aspects, the present disclosure provides a separator assembly, where separation of a liquid-liquid mixture can be actuated on-demand. In certain variations, such a separator assembly comprises (i) a separator membrane and (ii) an electrically conductive member. The (i) separator membrane comprises at least one layer comprising a porous oleophobic or superoleophobic material capable of separating a liquid-liquid mixture comprising a first component and a second distinct component when electrical potential is present (for example, when an electrical potential is present, the first component in the liquid-liquid mixture is actuated and passes through the (i) separator membrane). The (ii) electrically conductive member is present for applying electrical potential across the at least one layer of porous oleophobic or superoleophobic material of the separator membrane, so as to facilitate separation of the first component from the second component in the liquid-liquid mixture.

In other aspects, the present disclosure provides a separation device. The separation device comprises a separator membrane assembly for processing a liquid-liquid mixture comprising a first component and a second distinct component. The separator membrane assembly comprises (i) a separator membrane comprising at least one layer comprising a porous oleophobic or superoleophobic material; and (ii) an electrically conductive member capable of applying electrical potential across the at least one layer of porous oleophobic or superoleophobic material of the separator membrane. The separator membrane assembly has a first operating condition and a second operating condition. In the first operating condition, electrical potential is absent so that none of the liquid-liquid mixture passes through the separator membrane assembly. In a second operating condition; however, an electrical potential is applied across the porous oleophobic (or superoleophobic) material of the separator membrane via the electrically conductive member so as to actuate or facilitate passage of the first component of the liquid-liquid mixture (through the separator membrane assembly), while the second component does not pass through the separator membrane assembly. In this manner, the separation device enables on-demand electric field driven separations of the first component from the second component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1(a)-(h) shows separation of liquid-liquid mixtures of free oil and water with applied voltage according to certain aspects of the present teachings. (a) shows macroscopic contact angles for water and hexadecane (HD) as a function of applied voltage on the non-textured substrate. (b) and (c): the macroscopic contact angle for hexadecane remains unchanged with increasing voltage. (d) and (e): the macroscopic contact angle for water decreases with increasing voltage. (f) is a schematic showing the pressure-induced sagging of the liquid-air interface. (g) is an apparatus with a liquid column of free oil (dyed red) and water (dyed blue) above an electrically actuated separator membrane before applying an electric field. The inset shows a schematic of the membrane module. (h) shows that water permeates through the membrane while hexadecane is retained above the membrane when a voltage V of about 2.0 kV is applied.

FIG. 2 is a schematic showing pressure-induced sagging of a liquid-air interface on a stack of three membranes with cylindrical texture forming an embodiment of a porous oleophobic or superoleophobic material of the separator membrane according to certain aspects of the present disclosure.

FIGS. 3(a)-(f): show size distribution of a dispersed phase determined using two techniques—optical microscopy image analysis for droplets above 1 μm in diameter and dynamic light scattering (DLS) for droplets below 1 μm. (a) is a representative optical microscopy image of a hexadecane-in-water feed emulsion (liquid-liquid mixture). (b)-(c) show number size distributions for the hexadecane-in-water feed emulsion for droplets greater than about 1 μm and less than about 1 μm, respectively. (d) shows a representative optical microscopy image of the water-in-hexadecane feed emulsion. (e)-(f) show the number size distributions for the water-in-hexadecane feed emulsion for droplets greater than about 1 μm and less than about 1 μm, respectively. (a) and (d) show representative optical microscopy images for the hexadecane-in-water and water-in-hexadecane feed emulsions, respectively. (b) and (e) show the number size distributions of the dispersed phase determined using Image analysis, in hexadecane-in-water and water-in-hexadecane feed emulsions, respectively. The average size of dispersed phase for both the hexadecane-in-water and water-in-hexadecane feed emulsions is between 10-20 μm. (e)-(f) show the number size distributions of the dispersed phase determined using DLS, for hexadecane-in-water and water-in-hexadecane feed emulsions, respectively. The size of dispersed phase in hexadecane-in-water feed emulsions is between 200-300 nm, while that in water-in-hexadecane feed emulsion is between 200-400 nm.

FIGS. 4(a)-(d): (a) shows macroscopic contact angles for water and hexadecane (HD) in the presence of a polysorbate 80 (PS80) non-ionic surfactant as a function of applied voltage on the non-textured substrate. (b) shows an apparatus with a liquid column of hexadecane-in-water emulsion above the membrane before applying an electric field. (c) a water-rich permeate passes through while hexadecane-rich retentate is retained above the membrane when a voltage V≈1.1 kV is applied. (d) Separation of the hexadecane-in-water emulsion using a scaled-up apparatus. In (b), (c), and (d) water is dyed blue and hexadecane in dyed red.

FIGS. 5(a)-(b): (a) shows thermogravimetric analysis (TGA) data for permeates and the retentates obtained from the batch separation of hexadecane-in-water and water-in-hexadecane emulsions. (b) shows transmittance data for hexadecane-in-water feed emulsion, water-in-hexadecane feed emulsion, and the corresponding permeates after separation.

FIGS. 6(a)-(b): show advancing and receding contact angles for hexadecane and water, respectively, as a function of surfactant (PS80) concentration.

FIGS. 7(a)-(e): (a) is an apparatus with a liquid column of a water-in-hexadecane emulsion above a separator membrane assembly according to certain aspects of the present disclosure before applying an electric field. (b) the water-in-hexadecane emulsion is demulsified into the water-rich and the hexadecane-rich phases upon applying an electric field to the separator membrane assembly according to certain aspects of the present teachings. (c) After the onset of demulsification, water-rich permeate passes through the separator membrane, while hexadecane-rich retentate is retained above the membrane when a voltage V≈2.0 kV is applied. (d) an apparatus used for continuous separation of water-in-hexadecane emulsions. Water-rich permeate passes through the membrane module at the bottom, while hexadecane-rich permeate passes through the hydrophobic and oleophilic membrane on the side-wall. In (a), (b), (c), and (d) water is dyed blue and hexadecane is dyed red. (e) TGA data for the water-rich and hexadecane-rich permeates.

Figure 2:
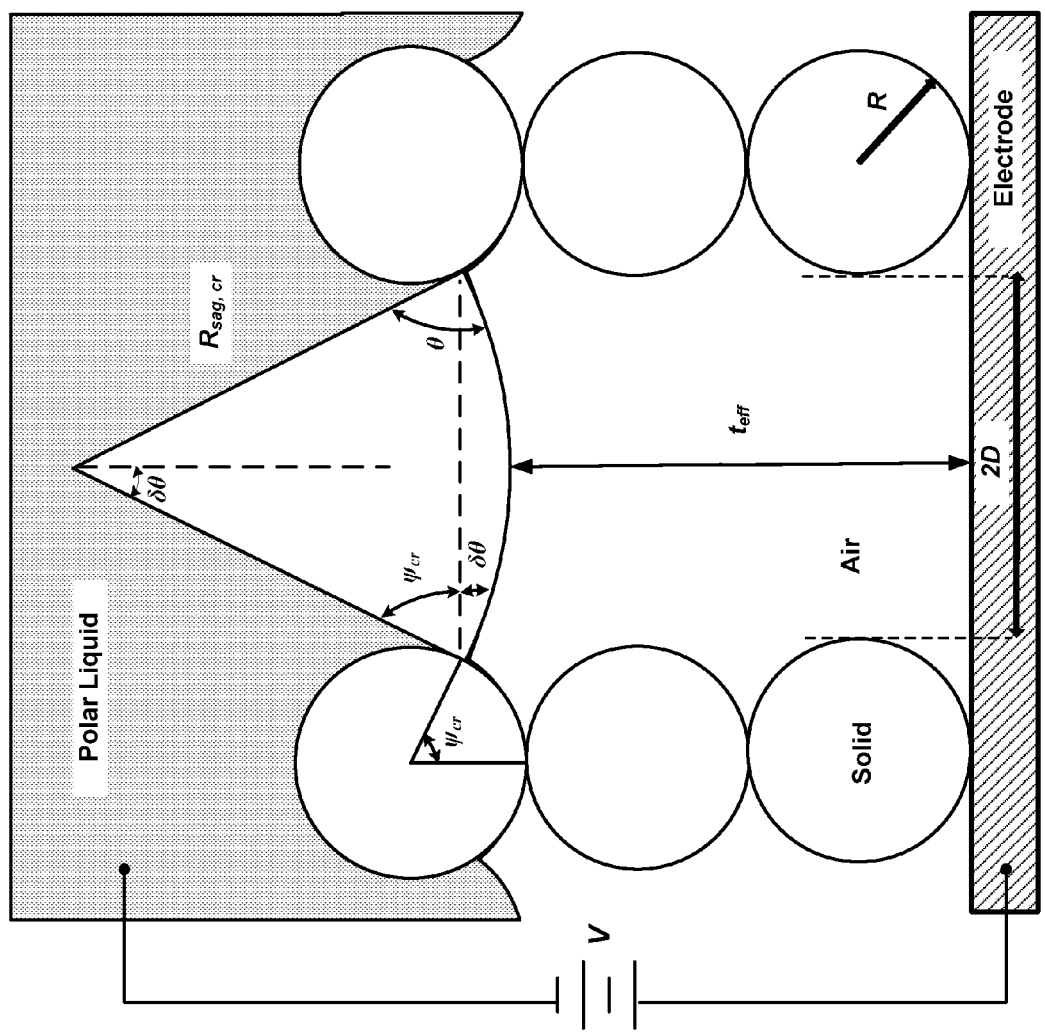

FIGS. 10(a)-(b): show schematics of exemplary separator membrane assembly having a first operating condition and a second operating condition that is used to separate an oil-water liquid-liquid mixture into an oil retentate and a water permeate.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges. Example embodiments will now be described more fully with reference to the accompanying drawings.

In various aspects, the present teachings provide devices and methods for electric field driven on-demand separation of liquid-liquid mixtures. The inventive technology is believed to provide for the first time, a membrane-based, single unit operation that allows for the gravity driven, on-demand separation of various oil-water mixtures, including for free oil and water, oil-in-water emulsions and water-in-oil emulsions. In certain embodiments, greater than or equal to about 99.9% separation efficiency can be achieved by the inventive technology.

For example, in one variation, a method of separating a liquid-liquid mixture is provided. The liquid-liquid mixture comprises a first component and a second distinct component. The liquid-liquid mixture comprises a first component present at an initial amount, as well as a second component. As used herein, a "mixture" encompasses not only solutions having components (e.g., phases, moieties, solvents, solutes, molecules, and the like) that are homogenously mixed together, but also combinations of components or materials that are not necessarily evenly, homogeneously, or regularly distributed when combined (e.g., unevenly mixed combinations of components, separated layers of immiscible components, unevenly distributed suspensions, and the like). In certain aspects, the first component is polar or hydrophilic while the second component is non-polar or hydrophobic. It should be noted that the liquid-liquid mixture is not limited to merely two components, but may include additional components in addition to the first and second components of interest.

In certain variations, the methods of the present teachings optionally comprise contacting the liquid-liquid mixture with a separator membrane. The separator assembly includes a separator membrane, which comprises a porous oleophobic material, and an electrically conductive member. In certain variations, the separator membrane of the separator membrane assembly comprises a porous superoleophobic material. An electrical potential is applied across the porous oleophobic or superoleophobic material of the separator membrane, which actuates or facilitates passage and separation of at least a portion of the first component through the separator membrane. When the electrical potential is absent; however, little or no liquid-liquid mixture passes through the separator membrane (in a non-actuated state). In this manner, the methods of certain aspects of the inventive technology provide the ability to provide on-demand separations, when an electrical field or potential is applied across the porous oleophobic or superoleophobic material of the separator membrane.

Thus, greater than or equal to about 85% of an initial amount of the first component present in the liquid-liquid mixture may be separated from the liquid-liquid mixture by passing through the inventive separator membrane. In certain variations, the separation achieved by applying electrical potential to the separator membrane assembly is greater than or equal to about 90 weight % up to 100 weight % of the initial amount of the first component from the liquid-liquid mixture. Further, such methods can be conducted as continuous processes. In certain variations, such processes are gravity-assisted. In certain variations, greater than or equal to about 97% of an initial amount of the first component is separated from the liquid-liquid mixture. In other variations, greater than or equal to about 99% of an initial amount of the first component is separated from the liquid-liquid mixture. Thus, the inventive technology can be employed to separate immiscible liquid components, like oil and water from a liquid-liquid mixture. Further, the inventive technology can be employed to separate certain immiscible component mixtures, e.g., mixtures of polar and nonpolar liquids, like alcohols and alkane mixtures, by way of non-limiting example.

The present disclosure provides a separator membrane assembly that comprises (i) a separator membrane comprising at least one layer comprising a porous oleophobic or superoleophobic material capable of separating a liquid-liquid mixture comprising a first component and a second distinct component when actuated. The separator membrane also comprises (ii) an electrically conductive member for applying electrical potential across the at least one layer of porous oleophobic or superoleophobic material, so as to facilitate separation of the first component from the second component in the liquid-liquid mixture. The one or more layers of porous oleophobic (or superoleophobic) material used in the separator membrane can be a porous substrate having a surface with a low surface energy. In certain aspects, the surface of the porous substrate material is considered to be oleophobic if it has an apparent advancing dynamic contact angle of greater than or equal to about 90° for a preselected oil, such as hexadecane. In certain other aspects, the surface of the porous substrate material is considered to be superoleophobic if it has an apparent advancing dynamic contact angle of greater than or equal to about 150° for a preselected oil, such as hexadecane.

A porous oleophobic or superoleophobic material for use as a separator membrane can be formed by including a low surface energy material, which is optionally oleophobic. In certain variations, a second polymeric material may be combined with the low surface energy material to form the porous oleophobic or superoleophobic material. The second polymeric material may comprise a polymer selected from the group consisting of: poly(methyl methacrylate) (PMMA), poly(ethyl methacrylate) (PEMA), perfluorinated polymers, poly(dimethyl)siloxane (PDMS), and combinations thereof. The second polymeric material may be cross-linked and combined with the low surface energy material. Suitable ranges of the low surface energy material to the second polymeric material can be about 1:100 to about 100:1. The low surface energy material may be included with the second polymeric material at 1% by weight to about 99% by weight of the total mixture, while the second polymeric material is optionally present in the mixture at 1% by weight to about 99% by weight of the total mixture. In certain aspects, after the first low surface energy material and the second polymeric material are applied to the surface of the porous substrate, so that the surface exhibits oleophobic properties. In certain variations, the surface is considered to be oleophobic in that it has an apparent advancing dynamic contact angle of greater than or equal to about 90° for a preselected oil, such as hexadecane. In other variations, the surface is considered to be superoleophobic in that it has an apparent advancing dynamic contact angle of greater than or equal to about 150° for a preselected oil, such as hexadecane.

In yet other variations, the present disclosure provides a separator device for continuously conducting such separations processes. For example, such an apparatus may have a configuration so that the liquid-liquid mixture is gravity fed towards the separator membrane assembly. In certain variations, the separations can occur in a single stage or unit. The separator membrane assembly comprises (i) a separator membrane comprising at least one layer comprising a porous oleophobic (or superoleophobic) material; and (ii) an electrically conductive member capable of applying electrical potential across the at least one layer of porous oleophobic (or superoleophobic) material. The separator membrane assembly is operable to continuously separate the first component from the liquid-liquid mixture, when an electrical potential or electrical field is applied across the porous oleophobic (or superoleophobic) materials of the separator membrane.

Thus, the separator membrane assembly has a first operating condition and a second operating condition. In the first operating condition, any electrical potential is absent so that none or minimal amounts of the liquid-liquid material pass through the separator membrane assembly. In a second operating condition; however, the separator membrane has electrical potential applied across the porous oleophobic (or superoleophobic) material via the electrically conductive member, so as to actuate or facilitate passage of the first component of the liquid-liquid mixture (through the separator membrane assembly), while the second component does not pass through the actuatable separator membrane assembly. In this manner, the separation device enables on-demand electric field driven separations of the first component from the second component of the liquid-liquid mixture.

Imposing an electric field on the separations process provides an adept and facile route for tuning the wettability of polar (or conducting) liquids. A decrease in a macroscopic contact angle for a sessile polar liquid droplet on a dielectric material in response to an electric field applied across the dielectric is commonly known as electrowetting on a dielectric (EWOD). EWOD is expressed by the Young-Lippmann equation as:

$$\cos\theta^{ew} = \cos\theta + \frac{\varepsilon_0 \varepsilon_d}{2\gamma_{12} d} V^2 \qquad (1)$$

Here, $\theta^{ew}$ is the macroscopic contact angle observed at a distance on the order of dielectric thickness d or larger from the three-phase contact line. $\theta$ is the Young's contact angle, $\varepsilon_0$ is the vacuum permittivity, $\gamma_{12}$ is the interfacial tension between the liquid and ambient medium, and V is the voltage applied across the dielectric of permittivity $\varepsilon_d$. While the macroscopic contact angle decreases under an electric field, the microscopic contact angle close to the three-phase contact line remains unchanged and equal to the Young's contact angle. In contrast, non-polar liquids do not show such a decrease in the macroscopic contact angle.

To demonstrate the preferential wettability of water (polar liquid) over oil (nonpolar liquid) under an electric field, EWOD of water (surface tension, $\gamma_{lv}$=72.1 mN m$^{-1}$) and hexadecane (representative oil, $\gamma_{lv}$=27.5 mN m$^{-1}$) is conducted on a porous oleophobic and hydrophilic substrate considered to be a dielectric layer (a non-textured 50 wt. % fluorodecyl POSS+x-PDMS substrates (solid surface energy, $\gamma_{sv}$=10.4 mN m$^{-1}$)). FIG. 1(a) shows macroscopic contact angles for water and hexadecane as a function of the voltage V applied across the dielectric layer. The macroscopic contact angle for hexadecane ($\theta_{hexadecane}^{ew}$=72°) is independent of V (FIGS. 1(b) and 1(c)), while the macroscopic contact angle for water decreases from $\theta_{water}^{ew}$=115° at V=0 V (FIG. 1(d)) with increasing voltage and finally saturates at $\theta_{water}^{ew}$=56° for all V>1.5 kV (FIG. 1(e)). For $\varepsilon_d$=1.9, the predictions from the Young-Lippmann equation match well with the experimental data, except for the contact angle saturation at high voltage (FIG. 1(a)). The inability of Eq. 1 to predict contact angle saturation is well documented in literature and continues to remain an active area of research.

While EWOD is traditionally employed on non-textured substrates; however, EWOD can also be employed with textured substrates. When a liquid contacts a textured substrate, it can adopt either the Cassie-Baxter state or the Wenzel state. On textured substrates, polar liquids can transition from the Cassie-Baxter state to the Wenzel state in response to the applied electric field. In the Cassie-Baxter state, the liquid-air interface makes an angle θ, locally with the substrate. As the applied pressure $P_{applied}$ on the liquid increases, the liquid-air interface bends downward, thereby increasing the sagging angle δθ. This in turn causes the liquid-air interface to advance downward along the solid surface to locally maintain an angle θ with the substrate (FIG. 1(f)). For textured substrates possessing a spherical or cylindrical geometry and sufficiently large pore depth (such that the sagged liquid-air interface does not touch the bottom surface), the liquid-air interface continues to bend and advance downward along the surface curvature with increasing pressure, until it approaches a critical texture angle $\psi_{cr}$.

A derivation of a maximum pressure $P_{critical}$ that the liquid-air interface can withstand, and the estimated values of $P_{critical}$ is as follows. A liquid in the Cassie-Baxter state on a textured surface composed of periodic, non-woven cylindrical fibers with radius R and half inter-fiber spacing D (see FIG. 1(f)). The liquid-air interface is located at a local texture angle ψ of the re-entrant texture with a sagging angle=θ−ψ, as shown in FIG. 1(f). A force balance between the applied pressure $P_{applied}$ on a droplet and the surface tension $\gamma_{12}$ can be expressed as:

$$P_{applied} \cdot (\text{interfacial area}) = \gamma_{12} \cdot (\text{contact line length}) \cdot \sin \delta\theta \quad (S1)$$

For cylindrical fibers of length L, equation (S1) becomes:

$$P_{applied} \cdot L \cdot 2(D+R-R\sin\psi) = \gamma_{12} \cdot 2L \cdot \sin\delta\theta \quad (S2)$$

Simplifying equation (S2), we get:

$$P_{applied} = \frac{\gamma_{12}\sin(\theta-\psi)}{D+R-R\sin\psi} \quad (S3)$$

For a given liquid and re-entrant texture geometry, equation (S3) indicates that the applied pressure $P_{applied}$ determines the local texture angle ψ, where the liquid forms a stable composite interface. The critical texture angle $\psi_{cr}$ is determined, which corresponds to the maximum pressure $P_{critical}$ that the liquid-air interface can withstand by solving:

$$\frac{dP_{applied}}{d\psi} = 0 \text{ with } \frac{d^2 P_{applied}}{d\psi^2} < 0 \text{ at } \psi = \psi_{cr} \quad (S4)$$

From equations (S3) and (S4):

$(D+R-R\sin\psi_{cr})\cdot(-\cos(\theta-\psi_{cr}))-\sin(\theta-\psi_{cr})\cdot(-R\cos\psi_{cr})=0 \Rightarrow (D+R)\cdot\cos(\theta-\psi_{cr})-R\sin\theta=0$ Simplifying this further is:

$$P_{critical} = \frac{\gamma_{12}\sin(\theta-\psi_{cr})}{D+R-R\sin\psi_{cr}}, \quad (S5)$$

$$\text{where } \psi_{cr} = \theta - \cos^{-1}\left(\frac{R\sin\theta}{R+D}\right)$$

When $P_{applied} < P_{critical}$, the liquid-air interface spontaneously advances downwards (i.e., to $\psi < \psi_{cr}$) until it reaches the bottom of the texture (ψ=0).

Table 1 shows the values of $P_{critical}$ for water and hexadecane, with and without surfactants, on porous oleophobic membrane materials (dip-coated nylon membranes having R=20.3 μm, 2D=28 μm). The estimation of the Young's contact angle θ is discussed below. Surface tensions $\gamma_{12}$ for water and hexadecane with surfactants are estimated using a capillary rise method.

TABLE 1

Calculated values of $P_{critical}$ for water and hexadecane, with and without surfactants.

| | θ ($\theta_{adv}$, $\theta_{rec}$) | $\gamma_{12}$ (mN/m) | $\psi_{cr}$ | $P_{critical}$ (Pa) |
|---|---|---|---|---|
| Water | 115° (122°, 109°) | 72.1 | 57.4° | 3540 |
| Water with 1.2 mg/mL PS80 | 79° (95°, 65°) | 40.2 | 24.5° | 1265 |
| Hexadecane | 72° (77°, 68°) | 27.5 | 16.3° | 794 |
| Hexadecane with 0.3 mg/mL PS80 | 68° (75°, 61°) | 24.9 | 11.3° | 686 |
| Hexadecane with 1.4 mg/mL Span80 | 68° (76°, 61°) | 25.7 | 11.3° | 708 |

Cassie-Baxter to Wenzel Transition.

Referring to FIG. 2, pressure-induced sagging of the liquid-air interface on a stack of three distinct layers of membranes with cylindrical texture is shown. A polar liquid column is in the Cassie-Baxter state on the separator membrane assembly (see FIG. 9). The separator membrane assembly includes a stack of three dip-coated nylon membranes and an electrically conductive member (e.g., an electrode), as shown by the schematic in FIGS. 2 and 9. When an electric field is applied across the electrode and the polar liquid column on the textured substrate, Maxwell stress $P_{Maxwell} = \epsilon_0 \epsilon_d V^2 / 2t_{eff}^2$ (with parallel plate capacitor assumption) is exerted on the liquid-air interface. When the liquid-air interface is located at $\psi=\psi_{cr}$ on the first layer of texture (i.e., the top dip-coated nylon membrane), $t_{eff}$ is given as (FIG. 2):

$$t_{eff} = 6R - R(1+\cos\psi_{cr}) - R_{sag,cr}[1-\cos(\theta-\psi_{cr})] \quad (S6)$$

Here, $R_{sag,cr}=(D+R-R\sin\psi_{cr})/\sin(\theta-\psi_{cr})$ is a critical radius of curvature of the liquid-air interface. Using equation (S6), an estimation for $t_{eff}$=81.1 μm for water and $t_{eff}$=69.7 μm for water with 1.2 mg/mL of PS80 is provided.

The liquid-air interface can withstand the maximum pressure $P_{critical}$ when it is located at $\psi=\psi_{cr}$, as discussed above. If the applied voltage V is such that $P_{applied} = (P_{Bernoulli} + P_{Maxwell}) > P_{critical}$, the liquid-air interface spontaneously advances downwards (i.e., to $\psi < \psi_{cr}$) until it reaches the bottom of the first layer of texture. At the same applied voltage V, the liquid cannot form a stable composite interface on subsequent layers of the texture (e.g., the middle or the bottom dip-coated nylon membranes) because $P_{Maxwell}$ is amplified due to a decrease in $t_{eff}$, which leads to an increase in $P_{applied}$. Consequently, once the liquid-air interface advances past $\psi=\psi_{cr}$ on the first layer of texture, the liquid transitions from the Cassie-Baxter state to the Wenzel state.

While the advancing contact angle $\theta_{adv}$ and receding contact angle $\theta_{rec}$ are readily measurable quantities, the Young's contact angle $\theta$ is not a measurable quantity. However, it can be estimated from $\theta_{adv}$ and $\theta_{rec}$ as:

$$\theta = \cos^{-1}\left(\frac{\Gamma_{adv}\cos\theta_{adv} + \Gamma_{rec}\cos\theta_{rec}}{\Gamma_{adv} + \Gamma_{rec}}\right) \tag{S7}$$

$$\text{where,} \quad \Gamma_{adv} = \left(\frac{\sin^3\theta_{adv}}{2 - 3\cos\theta_{adv} + \cos^3\theta_{adv}}\right)^{1/3} \text{ and} \tag{S8}$$

$$\Gamma_{rec} = \left(\frac{\sin^3\theta_{rec}}{2 - 3\cos\theta_{rec} + \cos^3\theta_{rec}}\right)^{1/3} \tag{S9}$$

The measured advancing and receding contact angles, and the estimated Young's contact angles for water and hexadecane, with and without surfactants, on surfaces spin-coated with 50 wt. % fluorodecyl POSS+x-PDMS blend are listed in Table 1.

Therefore, the critical texture angle corresponds to the location where the liquid-air interface can withstand the maximum pressure $P_{critical}$ before transitioning to the Wenzel state. For textured substrates possessing a cylindrical geometry, such as the membranes used in the accordance with the present teachings, $P_{critical}$ is given as:

$$P_{critical} = \frac{\gamma_{12}\sin(\theta - \psi_{cr})}{D + R - R\sin\psi_{cr}}, \tag{2}$$

$$\text{where } \psi_{cr} = \theta - \cos^{-1}\left(\frac{R\sin\theta}{R+D}\right)$$

Here, R is the radius of the cylinder and D is half the inter-cylinder spacing.

A liquid column of height h above a textured substrate exerts a hydrostatic pressure $P_{hydrostatic}=\rho g h$ on the liquid-air interface. Here, $\rho$ is the effective density of the liquid column and the g is the acceleration due to gravity. In addition, when a polar liquid is subjected to an electric field, a Maxwell stress $P_{Maxwell}$ is exerted on the liquid-air interface, pulling it outward along the surface normal. Assuming a configuration similar to a parallel plate capacitor with air as the dielectric medium, a $P_{Maxwell}=\epsilon_0\epsilon_d V^2/2t_{eff}^2$. Here, $\epsilon_d=1$ is a relative permittivity of the dielectric medium (air), and $t_{eff}$ is the thickness of the dielectric medium or the effective distance between the sagged liquid-air interface and the bottom electrode. In EWOD with textured substrates, a polar liquid in the Cassie-Baxter state under gravity, i.e., $P_{hydrostatic}<P_{critical}$, will transition to the Wenzel state when the applied pressure $P_{applied}=(P_{hydrostatic}+P_{Maxwell})>P_{critical}$. On the other hand, a non-polar liquid in the Cassie-Baxter state under gravity, will not transition to the Wenzel state as it will not experience $P_{Maxwell}$.

Therefore in accordance with various aspects of the present teachings, for effective on-demand separation of oil-water mixtures, the separator membrane assembly includes a separator membrane that comprises at least one layer comprising oleophobic (or alternatively, a superoleophobic) membranes. Upon applying an electric field, under gravity, such a membrane forms a separator membrane that allows a first component, such as water, to permeate through, but retains the second component, such as oil (e.g., hexadecane). The separator membrane assembly comprising at least one membrane formed of an oleophobic layer (inset in FIG. 1(g); see also FIG. 9) assembled for this example includes a stack of three nylon membranes (2D=28 µm, R=20.3 µm) dip-coated with 50 wt. % fluorodecyl POSS+x-PDMS. A stainless steel membrane (2D=138 µm, R=56.5 µm) serves as one electrode, while a copper wire immersed in water serves as the counter electrode. The low solid surface energy and the re-entrant texture of the membrane allow it to support both water ($\theta_{water,adv}=142°$) and hexadecane ($\theta_{hexadecane,adv}^*=99°$) in the Cassie-Baxter state before applying an electric field. Here $\theta_{adv}^*$ refers to the apparent advancing contact angle of a liquid on a textured substrate. On non-textured 50 wt. % fluorodecyl POSS+x-PDMS substrates, at V=0 V, $\theta_{hexadecane}=72°$ and $\theta_{water}=115°$. Using Eq. 2, it is estimated that $P_{critical,\ hexadecane}=794$ Pa for the hexadecane-air interface and $P_{critical,\ water}=3540$ Pa for the water-air interface.

The separator membrane assembly can be sealed between two vertical glass tubes (FIG. 1(g); see also FIGS. 10(a)-(b)). In FIG. 1(g), a 4 cm column of water (dyed blue) is added to the upper tube immediately followed by a 4 cm column of hexadecane (dyed red). The membranes can support the total liquid column because the hydrostatic pressure $P_{hydrostatic}=694$ Pa<$P_{critical,\ water}=3540$ Pa. Upon applying an electric field, the Maxwell stress $P_{Maxwell}$ increases with increasing voltage V across the membranes. At V=2.1 kV, $t_{eff}=81.1$ µm is calculated as described above and $P_{applied}\approx P_{critical,\ water}$. This matches well with experimental observation of the permeation of water through the membrane module at an applied voltage V=2.0±0.3 kV for the permeation of water through the membrane module.

In accordance with various aspects of the present application, an electric potential or electric field is applied only for a short period of time, for example, less than or equal to about 5 minutes, optionally less than or equal to about 1 minute, optionally less than or equal to about 30 seconds, and in certain variations, a duration of only a few seconds. The duration of applying of electric potential is relatively short, because after water permeates through the nylon membranes, contact with the stainless steel membrane can create a path for current flow. After a few minutes, under gravity, all the water is collected in the lower tube, while hexadecane is retained in the upper tube (FIG. 1(h)). The layers in the separator membrane assembly can prevent permeation of the retained hexadecane because the hydrostatic pressure $P_{hydrostatic}=302$ Pa<$P_{critical,\ hexadecane}=794$ Pa. Separation of free oil and water is demonstrated and is believed to be the first report of on-demand (electric field actuated) separation of free oil and water driven by gravity. Such on-demand separation has other applications, besides oil-water separation, such as microfluidic valve design, that selectively allows one liquid to flow through while retaining the other. Such applications are likewise contemplated by the present teachings.

The inventive separation methodology is also applicable to oil-in-water emulsions and water-in-oil emulsions. In certain variations, greater than or equal to about 99.9% separation efficiency is achieved. Mixtures of oil and water are separated into three categories based on the average size or diameter of oil droplet ($d_{oil}$), namely a "free oil" if $d_{oil}$ greater than about 150 micrometers (µm), a "dispersed oil" if diameter $d_{oil}$ is less than about 150 µm and greater than about 20 µm, and an "emulsified oil" if $d_{oil}$ is less than about 20 µm. In certain aspects of the present disclosure, a treated liquid-liquid mixture comprises an emulsion of oil and water, for example, an oil-in-water emulsion (where water is the continuous phase and oil is the dispersed phase) or a water-in-oil emulsion (where oil is the continuous phase and water is the dispersed phase).

Typically, such oil and water emulsions are created by use of surface-active agents, like surfactants and detergents that stabilize the dispersed phase in smaller droplets. The hydrophilic-lipophilic balance (HLB) of a surfactant used in a surfactant-stabilized mixture of oil and water can be used to predict the formation of either an oil-in-water or a water-in-oil emulsion. However, depending on the concentration of the dispersed phase and/or the temperature of the system, an oil-in-water emulsion may invert to a water-in-oil emulsion or vice-versa (a water-in-oil emulsion inversion to an oil-in-water emulsion). In addition, as many as three different phases (oil, oil-in-water emulsion or water-in-oil emulsion, and water) may co-exist in oil-water mixtures. The inventive technology provides novel methods and separator membranes that are capable of successfully separating not only free oil and water mixtures, but also emulsions into water and oil phases, even those that include surfactants, as will be described in greater detail below.

Two model systems are used by way of non-limiting example to demonstrate separations with the separation assembly according to certain variations of the present teachings: non-ionic surfactant polysorbate 80 (PS80, 0.75 mg mL$^{-1}$) stabilized 50:50 vol:vol hexadecane-in-water emulsions and non-ionic surfactant sorbitane monooleate (span80, 1 mg mL$^{-1}$) stabilized 30:70 vol:vol water-in-hexadecane emulsions. The dispersed phase size distribution in hexadecane-in-water emulsions and water-in-hexadecane emulsions indicates that the highest number fraction of droplet diameters is between about 10 μm to 20 μm.

Size distribution of a dispersed phase can be determined using two techniques—optical microscopy image analysis for droplets above 1 μm in diameter and dynamic light scattering (DLS) for droplets below 1 μm. FIG. 3(a) is a representative optical microscopy image of a hexadecane-in-water feed emulsion (liquid-liquid mixture). FIGS. 3(b)-(c) show number size distributions for the hexadecane-in-water feed emulsion for droplets greater than about 1 μm and less than about 1 μm, respectively. FIG. 3(d) shows a representative optical microscopy image of the water-in-hexadecane feed emulsion. FIGS. 3(e)-(f) show the number size distributions for the water-in-hexadecane feed emulsion for droplets greater than about 1 and less than about 1 μm, respectively.

FIGS. 3(a) and (d) show representative optical microscopy images for the hexadecane-in-water and water-in-hexadecane feed emulsions, respectively. Ten different images with more than 100 drops per image were analyzed to reduce the error in the estimated size distribution. FIGS. 3(b) and (e) show the number size distributions of the dispersed phase determined using Image analysis, in hexadecane-in-water and water-in-hexadecane feed emulsions, respectively. The average size of dispersed phase for both the hexadecane-in-water and water-in-hexadecane feed emulsions is between 10-20 μm. FIGS. 3(c) and (f) show the number size distributions of the dispersed phase determined using DLS, for hexadecane-in-water and water-in-hexadecane feed emulsions, respectively. The size of dispersed phase in hexadecane-in-water feed emulsions is between 200-300 nm, while that in water-in-hexadecane feed emulsion is between 200-400 nm.

FIGS. 3(a)-(b) shows number size distributions of a permeate obtained from the separation of the hexadecane-in-water emulsion obtained with optical image analysis and DLS, respectively. In FIG. 3(a), the average size of dispersed phase in the permeate is between 10-20 μm. Comparing hexadecane-in-water feed emulsion with the permeate, it is evident that nearly all hexadecane droplets above 30 μm are removed during separation. FIG. 3(b) shows the number size distribution for the permeate obtained from separation of hexadecane-in-water emulsion determined by using DLS. The size of dispersed phase in the permeate is between 200-300 nm. Comparing the hexadecane-in-water feed emulsion with the permeate, it is evident that the droplet size distribution below 1 μm remains unchanged during separation.

To demonstrate preferential wetting of water over oil, in the presence of PS80, macroscopic contact angles are measured for water with 1.2 mg mL$^{-1}$ of PS80 ($\gamma_{lv}$=40.2 mN m$^{-1}$) and hexadecane with 0.3 mg mL$^{-1}$ of PS80 ($\gamma_{lv}$=24.9 mN m$^{-1}$) as a function of the voltage V applied across the dielectric layer (FIG. 4(a)). The macroscopic contact angle for hexadecane ($\theta_{hexadecane}^{ew}$=68°) is independent of V, while the macroscopic contact angle for water decreases from $\theta_{water}^{ew}$=80° at V=0 V until it saturates at $\theta_{water}^{ew}$=38° for all V>0.8 kV. For $\epsilon_d$=1.9 (same as in FIG. 1(a)), the predictions from Eq. 1 match well with experimental data. The experiments detailed below also indicate the preferential wetting of water over oil, when the oil droplet is surrounded by water, in the presence of PS80, as is the case for oil-in-water emulsions.

Hexadecane-water interfacial tension $\gamma_{ow}$ in the presence of PS80 is estimated as follows by using a relationship postulated by Fowkes:

$$\gamma_{ow} = \gamma_{ov} + \gamma_{wv} - 2\sqrt{\gamma_{ov}^d \gamma_{wv}^d} \tag{S10}$$

Here, $\gamma_{ow}$ is the hexadecane-water interfacial tension. $\gamma_{ov}$ and $\gamma_{wv}$ are the surface tensions, while $\gamma_{ov}^d$ and $\gamma_{wv}^d$ are the dispersive components of the surface tensions for hexadecane and water, respectively. $\gamma_{ov}=\gamma_{ov}^d$ for hexadecane (non-polar liquid). Using the capillary rise method, it is determined that $\gamma_{ov}$=24.9 mN/m with 0.3 mg/mL of PS80 and $\gamma_{wv}$=40.2 mN/m with 1.2 mg/mL of PS80. To estimate $\gamma_{wv}^d$, Young's equation is combined with the relationship postulated by Fowkes for the interfacial tension of a non-polar solid (such as a 50 wt. % fluorodecyl POSS+x-PDMS blend) and water to obtain:

$$\gamma_{wv}^d = \frac{\gamma_{wv} + (1 + \cos\theta)}{4\gamma_{sv}^d} \tag{S11}$$

Here, $\gamma_{sv}^d$ is the dispersive component of the solid surface energy and θ is the Young's contact angle for water. On a spin-coated surface of a porous material comprising 50 wt. % fluorodecyl POSS+x-PDMS, the contact angles for water with 1.2 mg/mL of PS80 is $\theta_{water}$=95°. Using this value in equation (S11), it is determined that $\gamma_{wv}^d$=32.6 mN/m for water with 1.2 mg/mL of PS80.

Substituting the values of $\gamma_{ov}$, $\gamma_{wv}$ and $\gamma_{wv}^d$ in equation (S10), $\gamma_{ow}$=8.1 mN/m in the presence of PS80. As may be expected, these values are significantly lower than the hexadecane-water interfacial tension ($\gamma_{ow}$=51.4 mN/m) in the absence of surfactant.

The membrane assembly that includes an electrode configuration used for the separation of hexadecane-in-water emulsions is the same as that used for free oil and water separation. In the presence of PS80, on non-textured 50 wt. % fluorodecyl POSS+x-PDMS porous substrates, at V=0 V, $\theta_{hexadecane}$=68° and $\theta_{water}$=79° (SI section 3). Using Eq. 2, $P_{critical,\ hexadecane}$=686 Pa for the hexadecane-air interface ($\gamma_{lv}$=24.9 mN m$^{-1}$) and $P_{critical,\ water}$=1265 Pa for the water-air interface ($\theta_{lv}$=40.2 mN m$^{-1}$). The membranes can support a 3 cm column of 50:50 vol:vol hexadecane-in-water emulsion (FIG. 4(b)) because $P_{hydrostatic}$=260 Pa<$P_{critical,\ water}$=1265 Pa. Upon applying the electric field, $P_{Maxwell}$ increases with increasing voltage and at V=1.1 kV, $t_{eff}$=69.7 μm), and $P_{applied} \approx P_{critical,\ water}$=1265 Pa. This matches well with experimental observation of the permeation of water-rich phase through the membrane module at an applied voltage V=1.1±0.3 kV. After separation (FIGS. 4(c)-(d)), the membranes can prevent the permeation of the hexadecane-rich phase (column height h=1.5 cm) because $P_{hydrostatic}$=113 Pa<$P_{critical,\ hexadecane}$=686 Pa.

The following three techniques are used to estimate the separation efficiency of the inventive oil-water emulsion separation methodology. The first is thermogravimetric analysis (TGA). The composition of the hexadecane-rich and the water-rich phases after separation can be estimated using TGA. FIG. 5(a) shows data for the hexadecane-rich retentates and the water-rich permeates obtained from the batch separation of both the hexadecane-in-water emulsions and the water-in-hexadecane emulsions. The data for pure water and as-obtained hexadecane (HD) are also shown for comparison. The measurements show that the permeates contain approximately 0.1 wt. % of hexadecane while the retentates contain approximately 0.1 wt. % of water.

A second method involves transmittance measurements to estimate the permeate (water-rich phase) quality relative to the feed emulsions. FIG. 5(b) shows the transmittance of hexadecane-in-water and water-in-hexadecane feed emulsions (absorbance normalized to 1), the transmittance of the corresponding permeates, as well as, the transmittance of pure water between 390 nm and 750 nm (visible spectrum). It is evident that both the feed emulsions are very turbid, while the corresponding permeates are very clear. This indicates that the inventive electric field driven membrane-based separation methodology leads to nearly complete separation.

Lastly, Karl Fischer analysis is widely used to estimate water content in various oils. The hexadecane-rich permeate from the continuous separation of water-in-hexadecane emulsion is determined to contain about 55 ppm water (i.e., about 0.0055 wt. % water). FIG. 5(a) shows TGA data for the permeates and the retentates obtained from the batch separation of hexadecane-in-water and water-in-hexadecane emulsions. Figure FIG. 5(b) shows transmittance data for hexadecane-in-water feed emulsion, water-in-hexadecane feed emulsion, and the corresponding permeates after separation. The thermogravimetric analysis (TGA) and transmittance measurements indicate that the permeate contains approximately 0.1 wt. % hexadecane while the retentate contains approximately 0.1 wt. % water.

The droplet size distribution in the permeate indicates that virtually all hexadecane droplets exceeding 30 μm in diameter are removed. The analysis also indicates that upon separation the surfactant fractionates into the water-rich and the hexadecane-rich phases depending upon its relative solubility. The location and concentration of the surfactant after oil-water emulsion separation, in other words, an estimated amount of surfactant in the permeate and the retentate after emulsion separation can be determined as follows. The permeate and retentate contact angles are measured and compared with calibration curves of contact angles for water and hexadecane as a function of surfactant concentration. The calibration curves are developed by measuring the contact angles on flat surfaces spin-coated with a 50 wt. % fluorodecyl POSS+x-PDMS blend. The 50 wt. % fluorodecyl POSS+x-PDMS blend is chosen because it is essentially non-polar.

In FIGS. 6(a)-(b) shows advancing and receding contact angles for hexadecane and water are shown, respectively, as a function of PS80 concentration. After the batch separation of PS80 stabilized hexadecane-in-water emulsion, the advancing and receding contact angles for the water-rich permeate are 94°±2° and 64°±2° while those of hexadecane-rich retentate are 76°±2° and 63°±2°. By comparing these values with FIGS. 6(a)-(b), it is evident that the concentration of PS80 in the water-rich permeate is between 1.2-1.5 mg/mL and the concentration of PS80 in the hexadecane-rich retentate is 0-0.3 mg/mL. This is because of the higher solubility of PS80 in water when compared to hexadecane.

In contrast to PS80 surfactant, Span80 is virtually insoluble in water. The advancing and receding contact angles for the water-rich permeates from the batch separation and the continuous separation of water-in-hexadecane emulsions are 123°±2° and 108°±2°, respectively. By comparing these values with those of water without any surfactant (see Table 1), it is evident that there is no Span80 in the water-rich phase. Consequently, after separation of water-in-hexadecane emulsions, it is estimated that nearly all the Span80 is in the hexadecane-rich phase.

Unlike oil-in-water emulsions described above, the separation of water-in-oil emulsions is believed to occur through a combination of two processes. First, water-in-oil emulsions can demulsify into water-rich and oil-rich phases via electrostatic coalescence. Immediately after the onset of demulsification, the preferential wettability transition of water over oil under an electric field (similar to the separation of free oil and water) results in complete separation of the water-rich and oil-rich phases.

Similar to PS80, in the presence of span80, the macroscopic contact angle for hexadecane with 1.4 mg mL$^{-1}$ span80 ($\gamma_{lv}$=25.7 mN m$^{-1}$), $\theta_{hexadecane}^{ew}$=68°, is independent of V. Since span80 is virtually insoluble in water, the macroscopic contact angles for water as a function of the voltage V applied across the dielectric layer are the same as those shown in FIG. 1(a).

The separator membrane assembly, including the electrode configuration for the separation of water-in-hexadecane emulsion are the same as those used for free oil and water, and oil-in-water emulsion separations. In the presence of span80, on non-textured 50 wt. % fluorodecyl POSS+x-PDMS substrates, at V=0 V, $\theta_{hexadecane}$=68° and $\theta_{water}$=115°. Using Eq. 2 above, it is estimated that $P_{critical,\ hexadecane}$=708 Pa for the hexadecane-air interface ($\gamma_{lv}$=25.7 mN m$^{-1}$) and $P_{critical,water}$=3540 Pa for the water-air interface ($\gamma_{lv}$=72.1 mN m$^{-1}$). The membranes can support a 3 cm column of 30:70 vol:vol water-in-hexadecane emulsion because $P_{hydrostatic}$=247 Pa<$P_{critical,\ hexadecane}$=708 Pa (FIG. 7(a)). Upon applying the electric field, water-in-hexadecane emulsion demulsifies into water-rich and hexadecane-rich phases due to electrostatic coalescence (FIG. 7(b)).

Immediately after the onset of demulsification, $P_{Maxwell}$ increases with increasing voltage, and at V=2.2 kV, it is calculated that $t_{eff}$=81.1 μm, $P_{applied} \approx P_{critical,\ water}$. This matches well with experimental observation of the permeation of water-rich phase through the membrane module at an applied voltage V=2.0±0.3 kV. Furthermore, after separation (FIG. 7(b)), the membranes can prevent the permeation of the hexadecane-rich phase (column height h=2.1 cm), because $P_{hydrostatic}$=158 Pa<$P_{critical, hexadecane}$=708 Pa. TGA and transmittance measurements indicate that the permeate contains about 0.1 wt. % hexadecane while the retentate contains about 0.1 wt. % water. Separation of water-in-hexadecane emulsion is observed. Thus, a single unit operation can desirably be used for on-demand separation of free oil-water, oil-in-water emulsions and water-in-oil emulsions driven by gravity.

In the batch separation apparatus discussed above, continuous addition of water-in-oil feed emulsion leads to accumulation of oil above the membrane and oil will eventually permeate through the membrane when $P_{hydrostatic}$>$P_{critical, hexadecane}$. Therefore, the present disclosure further contemplates a continuous separation apparatus (FIG. 7(d)) with two types of membrane modules operating in parallel—a separator membrane assembly shown in the inset of FIG. 1(g) at the bottom and a hydrophobic and oleophilic membrane (2D=37.5 μm, R=12.5 μm, $\gamma_{sv}$=35.6 mN m$^{-1}$) on the sidewall.

The water-in-hexadecane feed emulsion is continuously fed by a syringe pump. On applying a voltage V=2.0±0.3 kV, water-rich phase permeates through the membrane module at the bottom, while hexadecane-rich phase permeates through the membrane on the sidewall (FIG. 7(d)). TGA indicates that the water-rich permeate contains about 0.1 wt. % hexadecane and the hexadecane-rich permeate contains about 0.1 wt. % water (FIG. 7(e)), which is the limit of detection for the TGA. Karl Fischer analysis indicates that the hexadecane-rich permeate contains ~88 ppm water. Analysis of the hexadecane-rich permeate also indicates that at least 99% of emulsified water droplets are removed. Continuous separation of water-in-hexadecane emulsion in such a separation device is observed.

Figure 8:
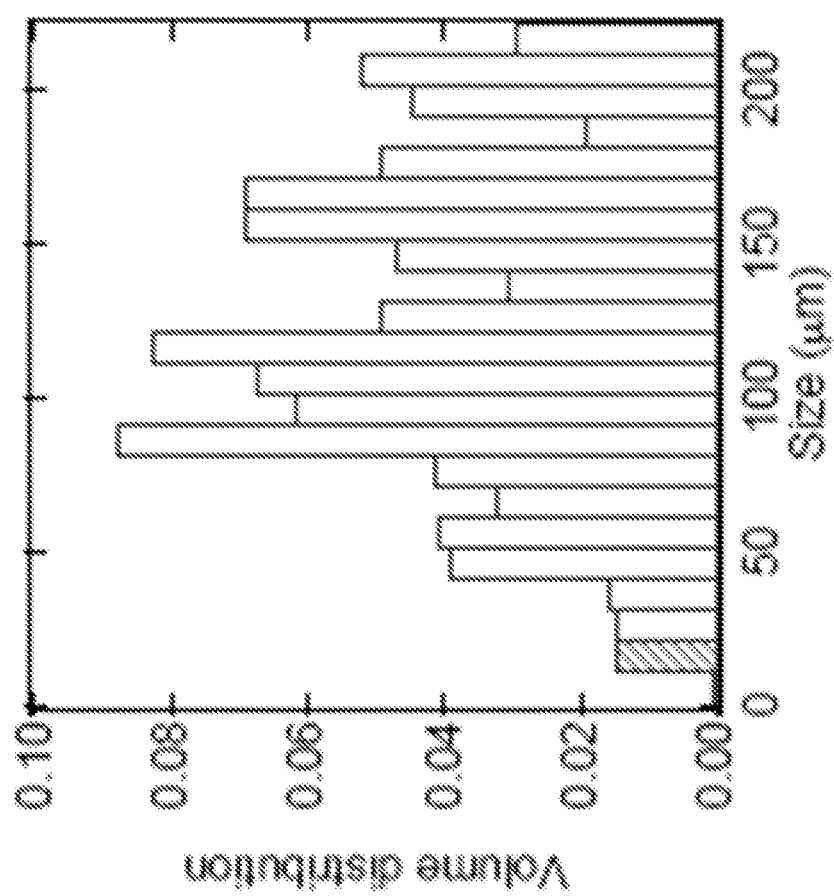
FIG. 8 shows volume size distribution of water droplets for the water-in-hexadecane feed emulsion. The dashed region represents droplets below 20 μm (emulsified droplets).

A fraction of emulsified water droplets removed from water-in-hexadecane feed emulsions is estimated as follows. FIG. 8 shows a volume size distribution of water droplets for the water-in-hexadecane feed emulsion. The dashed region represents droplets below 20 μm (emulsified droplets). 100 mL of 30:70 v:v water-in-hexadecane feed emulsion contains 30 mL of water and 70 mL of hexadecane. The volume fraction of emulsified water droplets (<20 mm) in liquid-liquid mixtures (e.g., feed emulsions) is determined to be 0.016 from the volume size distribution (see FIG. 8). Thus, the volume of emulsified water droplets in 100 mL of feed emulsion is 0.48 mL. In continuous separation, 100 mL of feed emulsion results in approximately 30 mL of water-rich permeate and 70 mL of hexadecane-rich permeate. Karl Fischer analysis indicates that the amount of water in the hexadecane-rich permeate is approximately 0.0055 wt. %, which is equivalent to approximately 0.0042 vol. %. Thus, the volume of water in the hexadecane-rich permeate is about 0.00296 mL. Even if it is assumed that the size of all the water droplets in the hexadecane-rich permeate is less than 20 μm, comparing the volume of the emulsified water droplets in the feed emulsion (0.48 mL) to that in the hexadecane-rich permeate (0.00296 mL), it can be concluded that that the volumetric fraction of emulsified droplets removed during separation is at least 99.4%.

In accordance with the present teachings, novel separator membranes are provided that include porous oleophobic (or superoleophobic) materials are included in separator membrane assemblies that provide the ability to separate various components, such as oil and water combinations, including those that have been stabilized by surface active agents, upon applying an electrical potential across the porous oleophobic (or superoleophobic) material of the separator membrane assembly. The inventive separator membrane assemblies are particularly well suited for continuous separation under gravity. In certain embodiments, a separator device incorporating such a separator membrane assembly, permits a first component, like water to readily pass when the electrical potential is applied, but prevents the passage of a second component, such as oil (whether in the presence or absence of an electrical field), resulting in rapid and efficient separation of the liquid-liquid mixture. See, for example, FIGS. 10(a)-(b). Using the inventive separator membrane assemblies in a separator device permits oil-water mixtures and surfactant-stabilized oil-in-water and water-in-oil emulsions to be separated into almost clean water and almost clean oil in a single stage of separation.

In certain variations, an efficiency of separation using the separator membrane assembly in a separator device is greater than or equal to about 85%, optionally greater than or equal to about 90%, optionally greater than or equal to about 95%, optionally greater than or equal to about 97%, optionally greater than or equal to about 99%, optionally greater than or equal to about 99.5%, and in certain preferred aspects, optionally greater than or equal to about 99.9% for free oil mixtures or for emulsions (including surfactant stabilized emulsions). Various embodiments of the present teachings can likewise be used as membrane separators for other immiscible component mixtures, such as mixtures of polar and non-polar liquids, like alcohols and alkane mixtures, by way of non-limiting example. Additional non-limiting exemplary areas of applicability include separation of produced water, clean-up of water discharge from oil refineries, waste water treatment, clean-up of oil spills, use as microcapillary valves, the like.

In certain variations, methods of separating a liquid-liquid mixture are provided. The method optionally comprises contacting a liquid-liquid mixture with a separator membrane assembly comprising a separator membrane that comprises a porous oleophobic material. In certain variations, the separator membrane comprises a superoleophobic material. The liquid-liquid mixture comprises a first component and a second distinct component. In certain variations, the first component comprises a polar molecule and the second component comprises a non-polar molecule. Then, an electrical potential is applied to the separator membrane to facilitate passage and separation of at least a portion of the first component through the separator membrane. The voltage required to trigger the separation can be computed by using a breakthrough pressure model that incorporates Maxwell stress and the hydrostatic pressure. In certain embodiments, the electrical potential or voltage applied across the porous oleophobic (or superoleophobic) material of the separator membrane (e.g., via the electrically conductive member) is about 0.01 to about 10 kV. However, as discussed above and as appreciated by those of skill in the art, the amount of applied electrical potential suitable for activating the separator membrane and achieving separation may vary depending on the material properties of the porous oleophobic substrate and the first component and second component. In certain embodiments, the contacting and the applying of the electrical potential across the porous oleophobic (or superoleophobic) material of the separator membrane assembly occurs in a single stage, so that the separation process of the first component occurs as a single process step. The contacting optionally occurs by gravity-feeding the liquid-liquid mixture to the separator membrane at ambient temperature and pressure conditions, in certain variations.

In various aspects, the first component is present at an initial amount in the liquid-liquid mixture, so that greater than or equal to about 85 weight % of the initial amount of the first component is separated from the liquid-liquid mixture after the applying of the electrical potential across the porous oleophobic material of the separator membrane of the separator membrane assembly. In certain variations, the first component is optionally hydrophilic or polar. The first component is present at an initial amount in the liquid-liquid mixture. After the separation, greater than or equal to about 99 weight % of the initial amount of the first component is removed from the liquid-liquid mixture. In yet other variations, the first component is water and the second component is oil, where the liquid-liquid mixture is a surfactant stabilized emulsion. Greater than or equal to about 99 weight % of the initial amount of the water is separated from the surfactant stabilized emulsion after the applying of the electrical potential across the porous oleophobic material of the separator membrane.

In certain variations, the porous oleophobic material of the separator membrane comprises a polymeric material, such as poly(methyl methacrylate) (PMMA), poly(ethyl methacrylate) (PEMA), perfluorinated polymers, cross-linked poly(dimethyl)siloxane (PDMS), or combinations thereof, and a low surface energy material comprising 1H,1H,2H,2H-hetadecafluorodecyl polyhedral oligomeric silsequioxane (F-POSS). In certain aspects, the porous oleophobic material of the separator membrane comprises a cross-linked poly(dimethyl)siloxane (PDMS) and a low surface energy material comprising 1H,1H,2H,2H-hetadecafluorodecyl polyhedral oligomeric silsequioxane (F-POSS).

In alternative variations, the first component is a first molecule having a first polarity and the second component is a second molecule having a second polarity, wherein the first polarity is greater than the second polarity and the inventive separator membrane assembly separates greater than or equal to about 90 weight % of the initial amount of the first component from the liquid-liquid mixture.

In yet other aspects, the present disclosure provides a separator membrane assembly. An exemplary separator membrane assembly comprises (i) a separator membrane comprising at least one layer comprising a porous oleophobic (or superoleophobic) material capable of separating a liquid-liquid mixture when electrical potential is present. In certain variations, the separator membrane comprises one or more layers of porous oleophobic (or superoleophobic) material. As discussed above, the liquid-liquid mixture comprises a first component and a second distinct component. The separator membrane assembly also comprises an electrically conductive member for applying the electrical potential across the at least one layer of porous oleophobic (or superoleophobic) material. Such an electrically conductive member may be a porous electrode layer that is disposed in electrical communication with at least a portion of the one or more layers of porous oleophobic (or superoleophobic) materials of the separator membrane. For example, the electrically conductive member optionally comprises stainless steel or other conductive metals known in the art.

Figure 9:
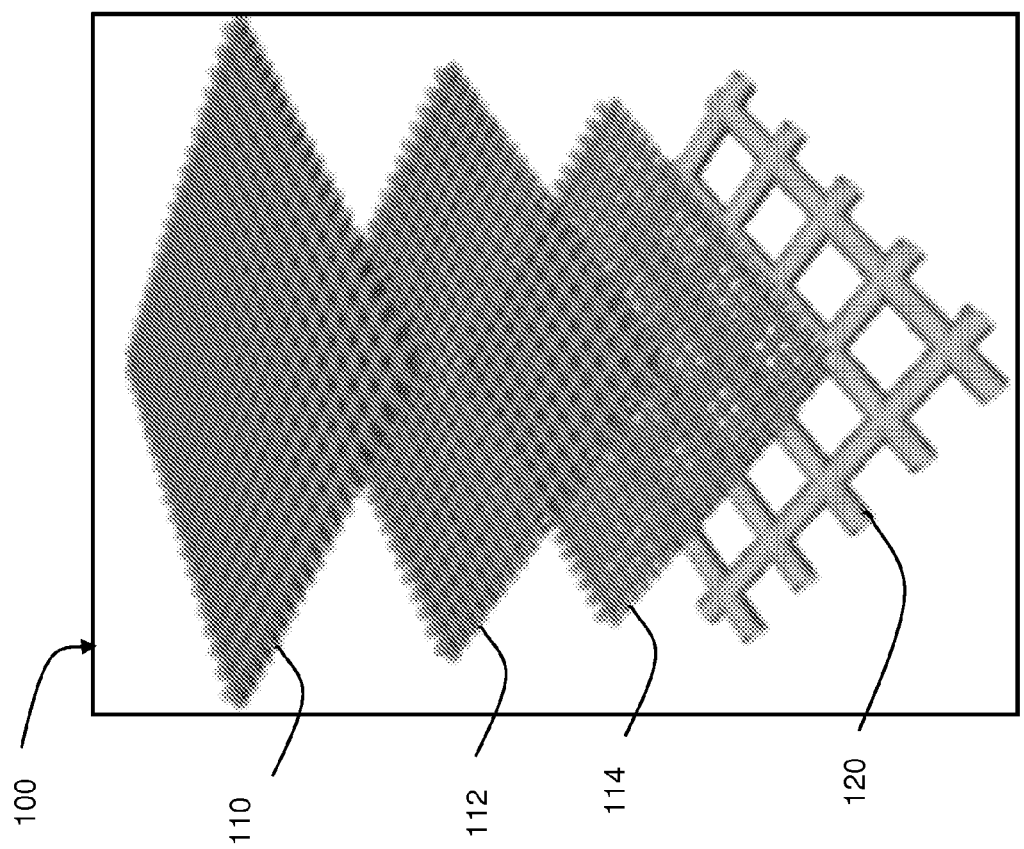
FIG. 9 is an exploded view of an exemplary separator membrane assembly comprising a plurality of layers of porous oleophobic (or superoleophobic) materials and a mesh electrically conductive member according to certain aspects of the present teachings.

In certain aspects, the at least one layer of porous oleophobic (or superoleophobic) material of the separator membrane may comprise a plurality of distinct layers of porous oleophobic (or superoleophobic) material to form a stack. The electrically conductive member is an electrically conductive porous material in electrical contact with the stack. As shown in FIG. 9, an exemplary separator membrane assembly 100 is depicted in an exploded view. The separator membrane assembly 100 comprises three distinct layers of porous oleophobic (or superoleophobic) material 110, 112, and 114 that when assembled are adjacent to one another to form a stack that forms the separator membrane. The separator membrane assembly 100 further comprises an electrically conductive porous electrode 120 that is disposed adjacent to one side of the stack of porous oleophobic (or superoleophobic) materials forming the separator membrane.

The porous oleophobic (or superoleophobic) material may comprise a porous material selected from the group consisting of: screen, mesh, paper, woven cloth, non-woven cloth, fabric, fiber, foam, molecular sieves, entangled nanowires, electrospun polymeric nanofibers, and combinations thereof. In certain variations, the material is a porous nylon material. In certain variations, an average pore size diameter of a plurality of pores in the porous oleophobic (or superoleophobic) material is greater than or equal to about 10 nm to less than or equal to about 1 mm.

Such a porous material may be treated or have one or more materials applied to provide the desired properties. For example, the porous material may be dip-coated in an oleophobic material. In certain aspects, the porous oleophobic (or superoleophobic) material comprises a low surface energy material selected from group consisting of: 1H,1H, 2H,2H-heptadecafluorodecyl polyhedral oligomeric silsequioxane (F-POSS), graphite fluoride, perfluorodecanethiol, perfluorodecyl trichlorosilane and perflorodecyl dimethyl chlorosilane, polytetrafluoroethylene, fluorosurfactants, fluorosilanes, derivatives, and combinations thereof. In certain variations, the porous oleophobic (or superoleophobic) material comprises a second polymeric material, such as a polymer selected from the group consisting of: poly(methyl methacrylate) (PMMA), poly(ethyl methacrylate) (PEMA), perfluorinated polymers, cross-linked poly(dimethyl)siloxane (PDMS), and combinations thereof. In certain variations, the porous oleophobic or superoleophobic material comprises a low surface energy material comprising 1H,1H, 2H,2H-hetadecafluorodecyl polyhedral oligomeric silsequioxane (F-POSS) and a second polymeric material is selected from the group consisting of: poly(methyl methacrylate) (PMMA), poly(ethyl methacrylate) (PEMA), perfluorinated polymers, cross-linked poly(dimethyl)siloxane (PDMS), and combinations thereof. In certain embodiments, the porous oleophobic or superoleophobic material comprises a low surface energy material comprising 1H,1H,2H,2H-hetadecafluorodecyl polyhedral oligomeric silsequioxane (F-POSS) and a second polymeric material comprises a cross-linked poly(dimethyl)siloxane (PDMS), and combinations thereof.

In certain variations, the present disclosure provides a separation device that comprises a separator membrane assembly for processing a liquid-liquid mixture comprising a first component and a second distinct component. The separator membrane assembly comprises (i) a separator membrane that comprises at least one layer comprising a porous oleophobic (or superoleophobic) material; and (ii) an electrically conductive member capable of applying electrical potential across the at least one layer of porous oleophobic material. FIGS. 10(a)-(b) show a separator membrane assembly that has a first operating condition (FIG. 10(a)) and a second operating condition (FIG. 10(b)). As can be seen, an exemplary liquid-liquid mixture is an oil-water mixture. The separator membrane of the separator membrane assembly is in electrical communication with an electrically conductive member attached to an electrical field generator/source of electrical potential. The first operating condition corresponds to the absence of any electrical potential being applied to the separator membrane, so that none of the liquid-liquid oil-water mixture passes through the separator membrane assembly. In a second operating condition (FIG. 10(b)), the electrical potential is applied via the electrically conductive member across the porous oleophobic (or superoleophobic) material of the separator membrane, so as to facilitate passage of the first component (water) of the liquid-liquid mixture through the separator membrane assembly. When electric potential is applied across the porous oleophobic material of the separator membrane, the potential can be applied from the electrode layer and to the liquid-liquid mixture. When electric potential is present in the second operating condition, the first component (e.g., a polar liquid) is actuated and permeates through the separator membrane, while the second component is retained above the separator membrane. The voltage required to trigger the separation can be computed using a breakthrough pressure model that incorporates Maxwell stress and the hydrostatic pressure. A controller, a computing unit or other processor can be used to control the separation processing, whether conducted continuously or in batch processing. As noted above, during the second operating condition, the second component (e.g., oil) does not pass through the separator membrane assembly. In this regard, a permeate comprising the first component passes through the separator membrane assembly, while a retentate comprising the second component fails to pass through and is retained by the separator membrane. As shown in FIG. 10(b), the retentate is 99.9 wt. % oil and the permeate is 99.9% water.

In certain variations, the separator membrane assembly is contained in a single-stage separator unit, so that the liquid-liquid mixture is separated in a single-stage process having a separation efficiency of greater than or equal to about 99% for separating the first component from the second component. In certain variations, the at least one layer of the separator membrane comprises a porous oleophobic (or superoleophobic) material that is oleophobic having an apparent advancing dynamic contact angle of greater than or equal to about 90° for a preselected oil or optionally superoleophobic, having an apparent advancing dynamic contact angle of greater than or equal to about 150° for a preselected oil. In certain embodiments, the surface of the porous oleophobic (or superoleophobic) material may comprise a low surface energy material selected from group consisting of: 1H,1H,2H,2H-heptadecafluorodecyl polyhedral oligomeric silsequioxane (F-POSS), graphite fluoride, perfluorodecanethiol, perfluorodecyl trichlorosilane and perflorodecyl dimethyl chlorosilane, polytetrafluoroethylene, fluorosurfactants, fluorosilanes, derivatives, and combinations thereof. In certain preferred variations, the porous oleophobic (or superoleophobic) material comprises a cross-linked material formed from a polymer comprising poly (dimethyl)siloxane (PDMS), as well as a low surface energy material comprising 1H,1H,2H,2H-hetadecafluorodecyl polyhedral oligomeric silsequioxane (F-POSS). In certain aspects, such a separation device provides a separation efficiency of greater than or equal to about 99% for separating the first component from the liquid-liquid mixture, where the first component of the liquid-liquid mixture is a polar or hydrophilic material.

Non-Textured Porous Substrate Fabrication

A 10:1 w:w ratio PDMS mixture of Sylgard184 base:curing agent (commercially available from Dow Corning) is prepared in a petri dish and cross-linked at 70° C. for 3 hours. A low surface energy material is used in certain variations, which comprises 1H,1H,2H,2H-Heptadecafluorodecyl Polyhedral Oligomeric SilSequioxane (fluorodecyl POSS, =8 mN/m) is synthesized as described in Mabry et al. *Angewandte Chemie* International Edition 47, 4137 (2008) and Tuteja et al., Science 318, 1618 (2007), each of which is incorporated by reference in its entirety. The cross-linked PDMS (x-PDMS) sheet (thickness, d~120 μm) is sliced into 2 cm×2 cm pieces and spin-coated with 10 mg mL$^{-1}$ solutions of 50 wt. % fluorodecyl POSS+PDMS in Asahiklin AK-225 (Structure Probe, Inc.) at 1000 RPM for 20 seconds and cross-linked at 70° C. for 1 hour. The solid surface energies are estimated using the Owens-Wendt approach.

Textured Porous Substrate Fabrication 2 cm×2 cm pieces of nylon membranes (mesh size 376, R=20.3 μm, 2D=28 μm) are dip-coated with 10 mg mL$^{-1}$ solutions of 50 wt. % fluorodecyl POSS+PDMS in Asahiklin AK-225 for 30 min. Subsequently, the membranes are dried at room temperature for 3 minutes and cross-linked at 70° C. for 1 hour. The hydrophobic and oleophilic membranes used in continuous separation are made by dip-coating stainless steel membranes (R=12.5 μm, 2D=37.5 μm) in 10 mg mL$^{-1}$ solution of Desmopan 9370 (Bayer Materials Science) in THF.

Contact Angle Measurement

All contact angles are measured by advancing or receding about 2 μL of liquid onto the surface (Ramé-Hart 200-F1 goniometer).

The present teachings provide membrane-based separations that employ a single unit operation that allows for on-demand separation of various oil-water mixtures using gravity. Using the inventive methodology, on-demand separation of free oil and water, oil-in-water emulsions and water-in-oil emulsions, with greater than or equal to about 99.9% separation efficiency is achieved. The voltage required to trigger the separation is computed using a breakthrough pressure model that incorporates Maxwell stress and the hydrostatic pressure. As discussed above, the predictions from the model are found to match well with our experiments. The ease of scalability of the developed apparatus permits separation of significantly larger quantities of oil-water emulsions. Finally, a continuous oil-water emulsion separation device is provided that can be actuated or triggered on-demand to remove greater than or equal to about 99% of the emulsified droplets.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of separating a liquid-liquid mixture comprising:

contacting the liquid-liquid mixture with a separator membrane comprising a porous oleophobic material, wherein the liquid-liquid mixture comprises a first component and a second distinct component and the separator membrane has a first operating condition and a second operating condition, wherein in the first operating condition electrical potential is absent across the separator membrane, so that none of the liquid-liquid mixture passes through the separator membrane, and in the second operating condition, electrical potential is applied to the separator membrane to facilitate passage of the first component from the liquid-liquid mixture through the separator membrane, while the second distinct component of the liquid-liquid mixture does not pass through the separator membrane; and applying an electrical potential across the porous oleophobic material of the separator membrane to facilitate passage and separation of at least a portion of the first component through the separator membrane, while the second distinct component of the liquid-liquid mixture does not pass through the separator membrane.

2. The method of claim 1, wherein the first component is present at an initial amount in the liquid-liquid mixture, so that greater than or equal to about 85 weight % of the initial amount of the first component is separated from the liquid-liquid mixture after the applying of the electrical potential across the porous oleophobic material of the separator membrane.

3. The method of claim 2, wherein the contacting and the applying of the electrical potential across the porous oleophobic material of the separator membrane occurs in a single stage, so that the separation process of the first component occurs as a single process step.

4. The method of claim 1, wherein the first component is hydrophilic or polar and is present at an initial amount in the liquid-liquid mixture and greater than or equal to about 99 weight % of the initial amount of the first component is separated from the liquid-liquid mixture after the applying of the electrical potential across the porous oleophobic material of the separator membrane.

5. The method of claim 1, wherein the first component is water and the second component is oil and the liquid-liquid mixture is a surfactant stabilized emulsion, wherein greater than or equal to about 99 weight % of the initial amount of the water is separated from the surfactant stabilized emulsion after applying electrical potential across the porous oleophobic material of the separator membrane.

6. The method of claim 1, wherein the contacting occurs by gravity-feeding the liquid-liquid mixture to the separator membrane at ambient temperature and pressure conditions.

7. The method of claim 1, wherein the electrical potential applied across the porous oleophobic material of the separator membrane is about 0.01 to about 10 kV.

8. The method of claim 1, wherein the porous oleophobic material comprises a low surface energy material comprising 1H, 1H, 2H, 2H-hetadecafluorodecyl polyhedral oligomeric silsequioxane (F-POSS) and a polymer selected from the group consisting of: poly(methyl methacrylate) (PMMA), poly(ethyl methacrylate) (PEMA), perfluorinated polymers, cross-linked poly(dimethyl)siloxane (PDMS), and combinations thereof.

9. The method of claim 1, wherein the first component comprises a polar molecule and the second component comprises a non-polar molecule.

10. The method of claim 1, wherein the first component is a first molecule having a first polarity and the second component is a second molecule having a second polarity, wherein the first polarity is greater than the second polarity and the actuatable separator membrane separates greater than or equal to about 90 weight % of the initial amount of the first component from the liquid-liquid mixture.

11. A separator membrane assembly comprising:
(i) a separator membrane comprising at least one layer comprising a porous oleophobic material capable of separating a liquid-liquid mixture comprising a first component and a second component, the separator membrane having a first operating condition and a second operating condition; and (i) an electrically conductive member for applying the electrical potential across the at least one layer of porous oleophobic material, wherein in the first operating condition electrical potential across the separator membrane is absent, so that none of the liquid-liquid mixture passes through the separator membrane, and in the second operating condition, the electrical potential is applied via the electrically conductive member to the separator membrane so as to facilitate passage of a first component from the liquid-liquid mixture through the separator membrane, while a second component of the liquid-liquid mixture does not pass through the sparator membrane.

12. The separator membrane assembly of claim 11, wherein the porous oleophobic material comprises a low surface energy material selected from the group consisting of: 1H, 1H, 2H, 2H-heptadecafluorodecyl polyhedral oligomeric silsequioxane (F-POSS), graphite fluoride, perfluorodecanethiol, perfluorodecyl trichlorosilane and perflorodecyl dimethyl chlorosilane, polytetrafluoroethylene, fluorosurfactants, fluorosilanes, derivatives, and combinations thereof.

13. The separator membrane assembly of claim 11, wherein the porous oleophobic material is a superoleophobic porous material having an apparent advancing dynamic contact angle of greater than or equal to about 150° for a preselected oil.

14. The separator membrane assembly of claim 12, wherein the porous oleophobic material further comprises a polymer selected from the group consisting of: poly(methyl methacrylate) (PMMA), poly(ethyl methacrylate) (PEMA), perfluorinated polymers, cross-linked poly(dimethyl)siloxane (PDMS), derivatives, and combinations thereof.

15. The separator membrane assembly of claim 11, wherein the porous oleophobic material comprises a polymeric material formed from cross-linked poly(dimethyl) siloxane (PDMS) and a low surface energy material comprising 1H, 1H, 2H, 2H-hetadecafluorodecyl polyhedral oligomeric silsequioxane (F-POSS).

16. The separator membrane assembly of claim 11, further comprising a plurality of layers of the porous oleophobic material that form a stack, and wherein the electrically conductive member is an electrically conductive porous material in electrical contact with the stack.

17. The separator membrane assembly of claim 11, wherein the porous oleophobic material comprises a porous material selected from the group consisting of screen, mesh, paper, woven cloth, non-woven cloth, fabric, fiber, foam, molecular sieves, entangled nanowires, electrospun polymeric nanofibers, and combinations thereof.

18. The separator membrane assembly of claim 11, wherein an average pore size diameter of a plurality of pores in the porous oleophobic material is greater than or equal to about 10 nm to less than or equal to about 1 mm.

19. A separation device comprising:
a separator membrane assembly for processing a liquid-liquid mixture comprising a first component that is polar or hydrophilic and a second component that is non-polar or hydrophobic that comprises:
(i) a separator membrane comprising at least one layer comprising a porous oleophobic material; and
(ii) an electrically conductive member capable of applying electrical potential across the at least one layer of porous oleophobic material; wherein the separator membrane assembly has a first operating condition and a second operating condition, wherein in the first operating condition electrical potential is absent, so that none of the liquid-liquid material passes through the separator membrane, and in a second operating condition, the electrical potential is applied via the electrically conductive member so as to facilitate passage of the first component from the liquid-liquid mixture through the separator membrane, while the second component of the liquid-liquid mixture does not pass through the separator membrane.

20. The separation device of claim 19, wherein the separator membrane assembly is contained in a single-stage separator unit, so that the liquid-liquid mixture is separated in a single-stage process having a separation efficiency of greater than or equal to about 99% for separating the first component from the second component.

21. The separation device of claim 19, wherein the porous oleophobic material comprises a low surface energy material selected from the group consisting of: 1H, 1H, 2H, 2H-heptadecafluorodecyl polyhedral oligomeric silsequioxane (F-POSS), graphite fluoride, perfluorodecanethiol, perfluorodecyl trichlorosilane and perflorodecyl dimethyl chlorosilane, polytetrafluoroethylene, fluorosurfactants, fluorosilanes, derivatives, and combinations thereof.

22. The separation device of claim 19, wherein the porous oleophobic material comprises a low surface energy material comprising 1H, 1H, 2H, 2H-hetadecafluorodecyl polyhedral oligomeric silsequioxane (F-POSS) and a second polymer selected from the group consisting of:

poly(methyl methacrylate) (PMMA), poly(ethyl methacrylate) (PEMA), perfluorinated polymers, crosslinked poly(dimethyl)siloxane (PDMS), and combinations thereof.

23. The separation device of claim 19, wherein the separator membrane has a separation efficiency of greater than or equal to about 99% for separating the first component from the second component in the liquid-liquid mixture.

* * * * *